US009461320B2

United States Patent
Ballantine et al.

(10) Patent No.: US 9,461,320 B2
(45) Date of Patent: Oct. 4, 2016

(54) STRUCTURE AND METHOD FOR FUEL CELL SYSTEM WHERE MULTIPLE FUEL CELLS AND POWER ELECTRONICS FEED LOADS IN PARALLEL ALLOWING FOR INTEGRATED ELECTROCHEMICAL IMPEDANCE SPECTROSCOPY (EIS)

(71) Applicant: BLOOM ENERGY CORPORATION, Sunnyvale, CA (US)

(72) Inventors: Arne Ballantine, Palo Alto, CA (US); Ranganathan Gurunathan, Bangalore (IN); Prasad Pmsvvsv, Sunnyvale, CA (US); Anilkumar Vishnuvarjula, Bangalore (IN)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 66 days.

(21) Appl. No.: 14/619,779

(22) Filed: Feb. 11, 2015

(65) Prior Publication Data
US 2015/0228990 A1    Aug. 13, 2015

Related U.S. Application Data

(60) Provisional application No. 61/938,827, filed on Feb. 12, 2014.

(51) Int. Cl.
*H01M 8/04* (2016.01)
*H01M 8/24* (2016.01)
*H02M 1/14* (2006.01)

(52) U.S. Cl.
CPC ..... *H01M 8/04649* (2013.01); *H01M 8/04679* (2013.01); *H01M 8/04753* (2013.01); *H01M 8/249* (2013.01); *H01M 2250/10* (2013.01); *H02M 1/14* (2013.01); *Y02B 90/14* (2013.01)

(58) Field of Classification Search
CPC ............. H01M 8/04649; H01M 8/04679; H01M 8/04753; H01M 8/249; H01M 2250/10; Y02B 90/14
See application file for complete search history.

(56) References Cited

U.S. PATENT DOCUMENTS 3,453,087 A    7/1969    Herp, Jr. et al.
3,453,146 A    7/1969    Bawa et al.
(Continued)

FOREIGN PATENT DOCUMENTS

EP    0 398 111 A1    11/1990
EP    0 977 294    2/2000
(Continued)

OTHER PUBLICATIONS

International Search Report and Written Opinion received in connection with international application No. PCT/US2015/015425; mailed Apr. 30, 2015.
(Continued)

*Primary Examiner* — Raymond Alejandro
(74) *Attorney, Agent, or Firm* — The Marbury Law Group PLLC

(57) ABSTRACT

Systems, methods, and devices of the various embodiments enable electrochemical impedance spectroscopy ("EIS") to be performed on electrochemical devices, such as fuel cell stack segments, by power electronics connecting the electrochemical devices in parallel to a common load and/or bus. In an embodiment, the power electronics may compensate for any ripple generated during EIS such that no ripple is realized at the common load and/or bus.

32 Claims, 12 Drawing Sheets

(56) References Cited

U.S. PATENT DOCUMENTS

| | | |
|---|---|---|
| 3,488,266 A | 1/1970 | French |
| 3,527,565 A | 9/1970 | Banchik et al. |
| 3,531,263 A | 9/1970 | Sederquist |
| 3,607,419 A | 9/1971 | Keating, Jr. |
| 3,645,701 A | 2/1972 | Banchik et al. |
| 3,718,506 A | 2/1973 | Fischer et al. |
| 3,746,658 A | 7/1973 | Porta et al. |
| 3,972,731 A | 8/1976 | Bloomfield et al. |
| 3,973,993 A | 8/1976 | Bloomfield et al. |
| 3,976,506 A | 8/1976 | Landau |
| 3,982,962 A | 9/1976 | Bloomfield |
| 3,990,912 A | 11/1976 | Katz |
| 4,001,041 A | 1/1977 | Menard |
| 4,004,947 A | 1/1977 | Bloomfield |
| 4,041,210 A | 8/1977 | Van Dine |
| 4,098,722 A | 7/1978 | Cairns et al. |
| 4,182,795 A | 1/1980 | Baker et al. |
| 4,190,559 A | 2/1980 | Retallick |
| 4,315,893 A | 2/1982 | McCallister |
| 4,365,007 A | 12/1982 | Maru et al. |
| 4,374,184 A | 2/1983 | Somers et al. |
| 4,402,871 A | 9/1983 | Retallick |
| 4,430,304 A | 2/1984 | Spurrier et al. |
| 4,473,517 A | 9/1984 | Goedtke et al. |
| 4,473,622 A | 9/1984 | Chludzinski et al. |
| 4,522,894 A | 6/1985 | Hwang et al. |
| 4,532,192 A | 7/1985 | Baker et al. |
| 4,539,267 A | 9/1985 | Sederquist |
| 4,548,875 A | 10/1985 | Lance et al. |
| 4,554,223 A | 11/1985 | Yokoyama et al. |
| 4,567,117 A | 1/1986 | Patel et al. |
| 4,647,516 A | 3/1987 | Matsumura et al. |
| 4,654,207 A | 3/1987 | Preston |
| 4,657,829 A | 4/1987 | McElroy et al. |
| 4,670,359 A | 6/1987 | Beshty et al. |
| 4,678,723 A | 7/1987 | Wertheim |
| 4,696,871 A | 9/1987 | Pinto |
| 4,702,973 A | 10/1987 | Marianowski |
| 4,716,023 A | 12/1987 | Christner et al. |
| 4,722,873 A | 2/1988 | Matsumura |
| 4,728,584 A | 3/1988 | Isenberg |
| 4,737,161 A | 4/1988 | Szydlowski et al. |
| 4,792,502 A | 12/1988 | Trocciola et al. |
| 4,808,491 A | 2/1989 | Reichner |
| 4,810,472 A | 3/1989 | Andrew et al. |
| 4,812,373 A | 3/1989 | Grimble et al. |
| 4,820,314 A | 4/1989 | Cohen et al. |
| 4,824,740 A | 4/1989 | Abrams et al. |
| 4,828,940 A | 5/1989 | Cohen et al. |
| 4,847,051 A | 7/1989 | Parenti, Jr. |
| 4,865,926 A | 9/1989 | Levy et al. |
| 4,898,792 A | 2/1990 | Singh et al. |
| 4,904,548 A | 2/1990 | Tajima |
| 4,917,971 A | 4/1990 | Farooque |
| 4,933,242 A | 6/1990 | Koga et al. |
| 4,983,471 A | 1/1991 | Reichner et al. |
| 4,994,331 A | 2/1991 | Cohen |
| 5,009,967 A | 4/1991 | Scheffler |
| 5,034,287 A | 7/1991 | Kunz |
| 5,039,579 A | 8/1991 | Kinoshita |
| 5,047,299 A | 9/1991 | Shockling |
| 5,077,148 A | 12/1991 | Schora et al. |
| 5,079,105 A | 1/1992 | Bossel |
| 5,082,751 A | 1/1992 | Reichner |
| 5,082,752 A | 1/1992 | Koga et al. |
| 5,084,362 A | 1/1992 | Farooque |
| 5,084,363 A | 1/1992 | Reiser |
| 5,084,632 A | 1/1992 | Shinbara |
| 5,091,075 A | 2/1992 | O'Neill et al. |
| 5,100,743 A | 3/1992 | Narita et al. |
| 5,143,800 A | 9/1992 | George et al. |
| 5,169,730 A | 12/1992 | Reichner et al. |
| 5,170,124 A | 12/1992 | Blair et al. |
| 5,175,062 A | 12/1992 | Farooque et al. |
| 5,187,024 A | 2/1993 | Matsumura |
| 5,212,022 A | 5/1993 | Takahashi et al. |
| 5,227,256 A | 7/1993 | Marianowski et al. |
| 5,232,792 A | 8/1993 | Reznikov |
| 5,246,791 A | 9/1993 | Fisher et al. |
| 5,270,127 A | 12/1993 | Koga et al. |
| 5,302,470 A | 4/1994 | Okada et al. |
| 5,324,452 A | 6/1994 | Allam et al. |
| 5,328,779 A | 7/1994 | Tannenberger et al. |
| 5,340,660 A | 8/1994 | Fujisawa et al. |
| 5,340,664 A | 8/1994 | Hartvigsen |
| 5,344,721 A | 9/1994 | Sonai et al. |
| 5,346,779 A | 9/1994 | Nakazawa |
| 5,348,814 A | 9/1994 | Niikura et al. |
| 5,360,679 A | 11/1994 | Buswell et al. |
| 5,366,819 A | 11/1994 | Hartvigsen et al. |
| 5,441,821 A | 8/1995 | Merritt et al. |
| 5,453,146 A | 9/1995 | Kemper |
| 5,470,360 A | 11/1995 | Sederquist |
| 5,498,487 A | 3/1996 | Ruka et al. |
| 5,501,914 A | 3/1996 | Satake et al. |
| 5,505,824 A | 4/1996 | McElroy |
| 5,516,344 A | 5/1996 | Corrigan |
| 5,518,829 A | 5/1996 | Satake et al. |
| 5,527,631 A | 6/1996 | Singh et al. |
| 5,573,867 A | 11/1996 | Zafred et al. |
| 5,589,017 A | 12/1996 | Minh |
| 5,601,937 A | 2/1997 | Isenberg |
| 5,641,585 A | 6/1997 | Lessing et al. |
| 5,686,196 A | 11/1997 | Singh et al. |
| 5,693,201 A | 12/1997 | Hsu et al. |
| 5,733,499 A | 3/1998 | Takeuchi et al. |
| 5,733,675 A | 3/1998 | Dederer et al. |
| 5,741,605 A | 4/1998 | Gillett et al. |
| 5,763,114 A | 6/1998 | Khandkar et al. |
| 5,955,039 A | 9/1999 | Dowdy |
| 5,955,392 A | 9/1999 | Takeuchi et al. |
| 6,001,761 A | 12/1999 | Hata et al. |
| 6,013,385 A | 1/2000 | DuBose |
| 6,051,125 A | 4/2000 | Pham et al. |
| 6,106,964 A | 8/2000 | Voss et al. |
| 6,106,967 A | 8/2000 | Virkar et al. |
| 6,280,865 B1 | 8/2001 | Eisman et al. |
| 6,329,090 B1 | 12/2001 | McElroy et al. |
| 6,348,278 B1 | 2/2002 | Lapierre et al. |
| 6,361,892 B1 | 3/2002 | Ruhl et al. |
| 6,376,111 B1 | 4/2002 | Mathias et al. |
| 6,383,670 B1 | 5/2002 | Edlund et al. |
| 6,403,245 B1 | 6/2002 | Hunt |
| 6,436,562 B1 | 8/2002 | DuBose |
| 6,451,466 B1 | 9/2002 | Grasso et al. |
| 6,492,053 B1 | 12/2002 | Donelson et al. |
| 6,531,243 B2 | 3/2003 | Thom |
| 6,582,842 B1 | 6/2003 | King |
| 6,582,845 B2 | 6/2003 | Helfinstine et al. |
| 6,589,681 B1 | 7/2003 | Yamanis |
| 6,623,880 B1 | 9/2003 | Geisbrecht et al. |
| 6,638,575 B1 | 10/2003 | Chen et al. |
| 6,654,261 B2 | 11/2003 | Welches et al. |
| 6,655,150 B1 | 12/2003 | Eimer et al. |
| 6,656,625 B1 | 12/2003 | Thompson et al. |
| 6,691,095 B2 | 2/2004 | Singh et al. |
| 6,749,958 B2 | 6/2004 | Pastula et al. |
| 6,821,663 B2 | 11/2004 | McElroy |
| 6,835,488 B2 | 12/2004 | Sasahara et al. |
| 6,880,628 B2 | 4/2005 | Yoshida et al. |
| 6,924,053 B2 | 8/2005 | McElroy |
| 7,045,237 B2 | 5/2006 | Sridhar et al. |
| 7,067,208 B2 | 6/2006 | Gottmann et al. |
| 7,145,266 B2 | 12/2006 | Lynch et al. |
| 7,422,810 B2 | 9/2008 | Venkataraman et al. |
| 7,482,078 B2 | 1/2009 | Sridhar et al. |
| 7,593,243 B2 | 9/2009 | Ganev et al. |
| 7,705,490 B2 | 4/2010 | Srinivasan et al. |
| 7,713,649 B2 | 5/2010 | Hickey et al. |
| 7,878,280 B2 | 2/2011 | Sridhar et al. |
| 7,974,106 B2 | 7/2011 | Gurunathan et al. |
| 8,039,154 B2 | 10/2011 | Morita et al. |
| 8,101,307 B2 | 1/2012 | McElroy et al. |
| 8,137,855 B2 | 3/2012 | Weingaertner et al. |

(56) References Cited

U.S. PATENT DOCUMENTS

| | | | |
|---|---|---|---|
| 8,173,063 | B2 | 5/2012 | Zobl et al. |
| 8,440,362 | B2 | 5/2013 | Richards et al. |
| 8,563,180 | B2 | 10/2013 | Perry et al. |
| 8,652,697 | B2 | 2/2014 | Gottmann et al. |
| 8,877,399 | B2 | 11/2014 | Weingaertner et al. |
| 8,889,276 | B2 * | 11/2014 | Bernard ............ H01M 8/04753 429/428 |
| 8,968,943 | B2 | 3/2015 | Perry et al. |
| 2001/0049035 | A1 | 12/2001 | Haltiner, Jr. et al. |
| 2002/0004154 | A1 | 1/2002 | Pastula et al. |
| 2002/0015867 | A1 | 2/2002 | Cargnelli et al. |
| 2002/0028362 | A1 | 3/2002 | Prediger et al. |
| 2002/0058175 | A1 | 5/2002 | Ruhl |
| 2002/0106544 | A1 | 8/2002 | Noetzel et al. |
| 2002/0142208 | A1 | 10/2002 | Keefer et al. |
| 2002/0192516 | A1 | 12/2002 | Tajima |
| 2003/0021741 | A1 | 1/2003 | Childress et al. |
| 2003/0031904 | A1 | 2/2003 | Haltiner |
| 2003/0041445 | A1 | 3/2003 | Jang et al. |
| 2003/0049502 | A1 | 3/2003 | Dickman et al. |
| 2003/0157386 | A1 | 8/2003 | Gottmann |
| 2003/0162067 | A1 | 8/2003 | McElroy |
| 2003/0196893 | A1 | 10/2003 | McElroy |
| 2003/0205641 | A1 | 11/2003 | McElroy |
| 2003/0235725 | A1 | 12/2003 | Haltiner et al. |
| 2004/0018144 | A1 | 1/2004 | Briscoe |
| 2004/0089438 | A1 | 5/2004 | Valensa et al. |
| 2004/0096713 | A1 | 5/2004 | Ballantine et al. |
| 2004/0131912 | A1 | 7/2004 | Keefer et al. |
| 2004/0142215 | A1 | 7/2004 | Barbir et al. |
| 2004/0191597 | A1 | 9/2004 | McElroy |
| 2004/0191598 | A1 | 9/2004 | McElroy |
| 2004/0202914 | A1 | 10/2004 | Sridhar et al. |
| 2004/0217732 | A1 | 11/2004 | Zhu et al. |
| 2004/0224193 | A1 | 11/2004 | Mitlitsky et al. |
| 2005/0048334 | A1 | 3/2005 | Sridhar et al. |
| 2005/0048336 | A1 | 3/2005 | Takebe et al. |
| 2005/0048338 | A1 | 3/2005 | Kobayashi et al. |
| 2005/0053814 | A1 | 3/2005 | Imamura et al. |
| 2005/0056412 | A1 | 3/2005 | Reinke et al. |
| 2005/0106429 | A1 | 5/2005 | Keefer |
| 2005/0164051 | A1 | 7/2005 | Venkataraman et al. |
| 2005/0221137 | A1 | 10/2005 | Bandhauer et al. |
| 2005/0249988 | A1 | 11/2005 | Pearson |
| 2005/0287402 | A1 | 12/2005 | Maly et al. |
| 2006/0074574 | A1 * | 4/2006 | Gasda ............. H01M 8/04559 702/63 |
| 2006/0078788 | A1 | 4/2006 | Ramschak |
| 2006/0083964 | A1 | 4/2006 | Edlinger et al. |
| 2006/0115393 | A1 | 6/2006 | Reinke et al. |
| 2006/0147771 | A1 | 7/2006 | Russell et al. |
| 2006/0248799 | A1 | 11/2006 | Bandhauer et al. |
| 2006/0251934 | A1 | 11/2006 | Valensa et al. |
| 2006/0251939 | A1 | 11/2006 | Bandhauer et al. |
| 2006/0251940 | A1 | 11/2006 | Bandhauer et al. |
| 2007/0017367 | A1 | 1/2007 | McElroy et al. |
| 2007/0017368 | A1 | 1/2007 | Levan et al. |
| 2007/0017369 | A1 | 1/2007 | Levan et al. |
| 2007/0172708 | A1 | 7/2007 | Takebe et al. |
| 2007/0178338 | A1 | 8/2007 | McElroy et al. |
| 2007/0196704 | A1 | 8/2007 | Valensa |
| 2007/0243435 | A1 | 10/2007 | Dutta |
| 2007/0259256 | A1 | 11/2007 | Le Canut et al. |
| 2007/0262648 | A1 | 11/2007 | McKenzie |
| 2007/0269693 | A1 | 11/2007 | Perry |
| 2008/0038600 | A1 | 2/2008 | Valensa et al. |
| 2008/0075985 | A1 | 3/2008 | Gottmann |
| 2008/0124590 | A1 | 5/2008 | Ballantine et al. |
| 2008/0197190 | A1 | 8/2008 | Fujita |
| 2008/0318089 | A1 | 12/2008 | Schneider et al. |
| 2009/0029204 | A1 | 1/2009 | Venkataraman et al. |
| 2009/0029205 | A1 | 1/2009 | Venkataraman et al. |
| 2009/0042068 | A1 | 2/2009 | Weingaertner et al. |
| 2009/0208784 | A1 | 8/2009 | Perry |
| 2010/0216043 | A1 | 8/2010 | Gottmann et al. |
| 2010/0239924 | A1 | 9/2010 | McElroy et al. |
| 2011/0281185 | A1 | 11/2011 | Sridhar et al. |
| 2011/0300461 | A1 | 12/2011 | Manabe et al. |
| 2012/0099618 | A1 | 4/2012 | Nishi et al. |
| 2012/0146587 | A1 * | 6/2012 | Srinivasan ............ H02J 1/108 320/138 |
| 2013/0241496 | A1 * | 9/2013 | Kurayama ............ H02J 7/0031 320/134 |
| 2014/0009003 | A1 | 1/2014 | Ballantine et al. |
| 2014/0093802 | A1 | 4/2014 | Gottmann et al. |

FOREIGN PATENT DOCUMENTS

| | | |
|---|---|---|
| EP | 1 501 146 A2 | 1/2005 |
| JP | 2004-247290 A | 9/2004 |
| WO | WO 94/18712 | 2/2004 |
| WO | WO 2004/013258 A1 | 2/2004 |
| WO | WO 03/019707 A1 | 9/2004 |
| WO | WO 2004/076017 A2 | 9/2004 |
| WO | WO 2004/092756 | 10/2004 |
| WO | WO 2004/093214 | 10/2004 |
| WO | WO 2004/095618 A2 | 11/2004 |
| WO | WO 2008/141410 A1 | 11/2008 |

OTHER PUBLICATIONS

"Type BPL Granular Carbon", Calgon Product Bulletin, Calgon Corporation, Activated Carbon Division, 2 pgs.
Berlier, Karl et al., "Adsorption of $CO_2$ on Microporous Materials. 1. On Activated Carbon and Silica Gel", J. Chem. Eng. Data, 1997, vol. 42, pp. 533-537.
EG & G, Parsons, Inc., SAIC. Fuel Cell Handbook. $5^{th}$ Edition. USDOE. Oct. 2000. 9-1-9-4; 9-12-9-14.
Levan, M. Douglas et al., "Adsorption and Ion Exchange", Perry's Chemical Engineers' Handbook ($7^{th}$ Edition), 1997, 66 pgs.
Levan, M. Douglas et al., "Fixed-Bed Adsorption of Gases: Effect of Velocity Variations on Transition Types", AIChE Journal, vol. 34, No. 6, Jun. 1988, pp. 996-1005.
Manchado, M. Cabrejas et al., "Adsorption of $H_2$, $O_2$, CO, and $CO_2$ on a γ-Alumina: Volumetric and Calorimetric Studies", Langmuir, vol. 10, 1994, pp. 685-691.
Olivier, Marie-Georges et al., "Adsorption of Light Hyrdocarbons and Carbon Dioxide on Silica Gel", J. Chem. Eng. Data, 1997, vol. 42, pp. 230-233.
Qi, Nan et al., "Adsorption equilibrium modeling for water on activated carbons", Carbon, vol. 43, 2005, pp. 2258-2263.
Rudisill, Edgar N. et al., "Coadsorption of Hydrocarbons and Water on BPL Activated Carbon", Ind. Eng. Chem. Res., 1992, vol. 31, pp. 1122-1130.
Sward, Brian K. et al., "Simple Flow-Through Apparatus for Measurement of Mass Transfer Rates in Adsorbent Particles by Frequency Response", Fundamentals of Adsorption, K. Kaneko et al., eds., vol. 7, 2002, pp. 29-36. Published by IK International of Japan.
Sward, Brian K. et al., "Frequency Response Method for Measuring Mass Transfer Rates in Adsorbents via Pressure Perturbation", Adsorption, vol. 9, 2003, pp. 37-54.
Walton, Krista S. et al., "A Novel Adsorption Cycle for $CO_2$ Recovery: Experimental and Theoretical Investigations of a Temperature Swing Compression Process", Revised Manuscript, submitted in 1995 to Separation Science & Technology, 30 pgs.
Yang, Ralph T., "Adsorbents: Fundamentals and Applications", 2003, 4 pgs.
Yong, Zou et al., "Adsorption of Carbon Dioxide on Basic Alumina at High Temperatures", J. Chem. Eng. Data, 2000, vol. 45, pp. 1093-1095.
Yong, Zou et al., "Adsorption of carbon dioxide at high temperature—a review", Separation and Purification Technology, vol. 26, 2002, pp. 195-205.
Supplemental European Search Report and European Search Opinion, EP Application No. 06800263, Oct. 16, 2009, 11 pgs.

(56) References Cited

OTHER PUBLICATIONS

Notification of Reasons of Refusal issued in Japanese Patent Application No. 2008-524022, Jan. 24, 2012.
Anonymous, Presentation of the LabView-based software used in the Fuel Cell Technologies Testing System. Internet Article, Jul. 15, 2004, http://web.archive.org/web/20040715025135/fuelcelltechnologies.com/Support/Downloads/Tutorial.pdf.
Hamburger, R. O., et al., "LabView DSC Automates Fuel Cell Catalyst Research," Nov. 4, 2004, http://web.archive.org/web/20041104200039/http://bloomy.com/newsletters/fuelcellresearch.pdf.
Austin, "Cell and Stack Construction: Low-Temperature Cells," *Fuel Cells: A Review of Government-Sponsored Research, 1950-1964*, NASA SP-120, pp. 101-102, (1967).
"Low Cost, Compact Solid Oxide Fuel Cell Generator," (Technology Management Inc.).
"Low Cost, High Efficiency Reversible Fuel Cell (and Electrolyzer) Systems," (Technology Management Inc.), Proceedings of the 2001 DOE Hydrogen Program Review NREL/CP-570-30535, pp. 1-7, (2001).
Milliken et al., "Low Cost, High Efficiency Reversible Fuel Cell Systems," Proceedings of the 2002 U.S. DOE Hydrogen Program Review, NREL/CP-610-32405, pp. 1-14, (2002).
Mitlitsky, et al., "Regenerative Fuel Cells for High Altitude Long Endurance Solar Powered Aircraft," Intersociety Energy Conversion Engineering Conference (IECEC), UCRL-JC-113485, pp. 1-8, (Jul. 28, 1993).
Mitlitsky et al., "Unitized Regenerative Fuel Cells for Solar Rechargeable Aircraft and Zero Emission Vehicles," 1994 Fuel Cell Seminar, UCRL-JC-117130, pp. 1-7, (Sep. 6, 1994).
Ruhl, "Low Cost Reversible Fuel Cell System," Proceedings of the 2000 U.S. DOE Hydrogen Program Review, NREUCP-570-28890, pp. 1-9, (Jun. 15, 2000).
"Small, Ultra Efficient Fuel Cell Systems," (Technology Management Inc.), Advanced Technology Program ATP 2001 Competition, pp. 1-2, (Jun. 2002).
Lasia, A., "Electrochemical Impedance Spectroscopy and Its Applications," Modern Aspects of Electrochemistry, B. E. Conway, J. Bockris, and R.E. White, Edts., Kluwer Academic/Plenum Publishers, New York, vol. 32, p. 143-248, (1999).
International Search Report issued in PCT Application PCT/US2010/047540, mailed on May 30, 2011.
International Preliminary Report on Patentability issued in PCT Application PCT/US2010/047540, mailed on Mar. 15, 2012.
Written Opinion of the International Searching Authority of PCT/US2010/047540 mailed May 30, 2011.

\* cited by examiner

10

STRUCTURE AND METHOD FOR FUEL CELL SYSTEM WHERE MULTIPLE FUEL CELLS AND POWER ELECTRONICS FEED LOADS IN PARALLEL ALLOWING FOR INTEGRATED ELECTROCHEMICAL IMPEDANCE SPECTROSCOPY (EIS)

CROSS REFERENCE TO RELATED APPLICATIONS

This application claims the benefit of priority to U.S. Provisional Patent Application Ser. No. 61/938,827 filed Feb. 12, 2014, entitled "Structure and Method for Fuel Cell System Where Multiple Fuel Cells and Power Electronics Feed Loads in Parallel Allowing for Integrated Electrochemical Impedance Spectroscopy ("EIS")", the contents of which are incorporated herein by reference in their entirety.

BACKGROUND

Information technology ("IT") loads are often deployed in racks or cabinets that in most markets average nowadays 4-6 KW per rack. Technology is getting denser with racks going over 40 KW per rack and even higher for High Performance Computing applications. Applications in the range of 8-35 KW are becoming more and more popular with blades, heavy storage, and networking being integrated for mobility reasons.

Cloud computing is allowing utilization of more distributed configurations with better utilization of existing data centers, public clouds, and new private clouds created in a way that is allowing optimal operation for enterprises or the small and medium business (SMB) market, for example, by allowing "Everything as a Service" way of utilization for the cloud consumer. "Infrastructure as a Service" models are better synchronized to the requirements of businesses, therefore, there is a need in the market for building blocks for such infrastructure that will allow overall faster time to market at optimal cost.

SUMMARY

The systems, methods, and devices of the various embodiments enable electrochemical impedance spectroscopy ("EIS") to be performed on electrochemical devices, such as fuel cell stack segments, by power electronics connecting the electrochemical devices in parallel to a common load and/or bus. In an embodiment, the power electronics may compensate for any ripple generated during EIS such that no ripple is realized at the common load and/or bus.

DETAILED DESCRIPTION

Figure 1:
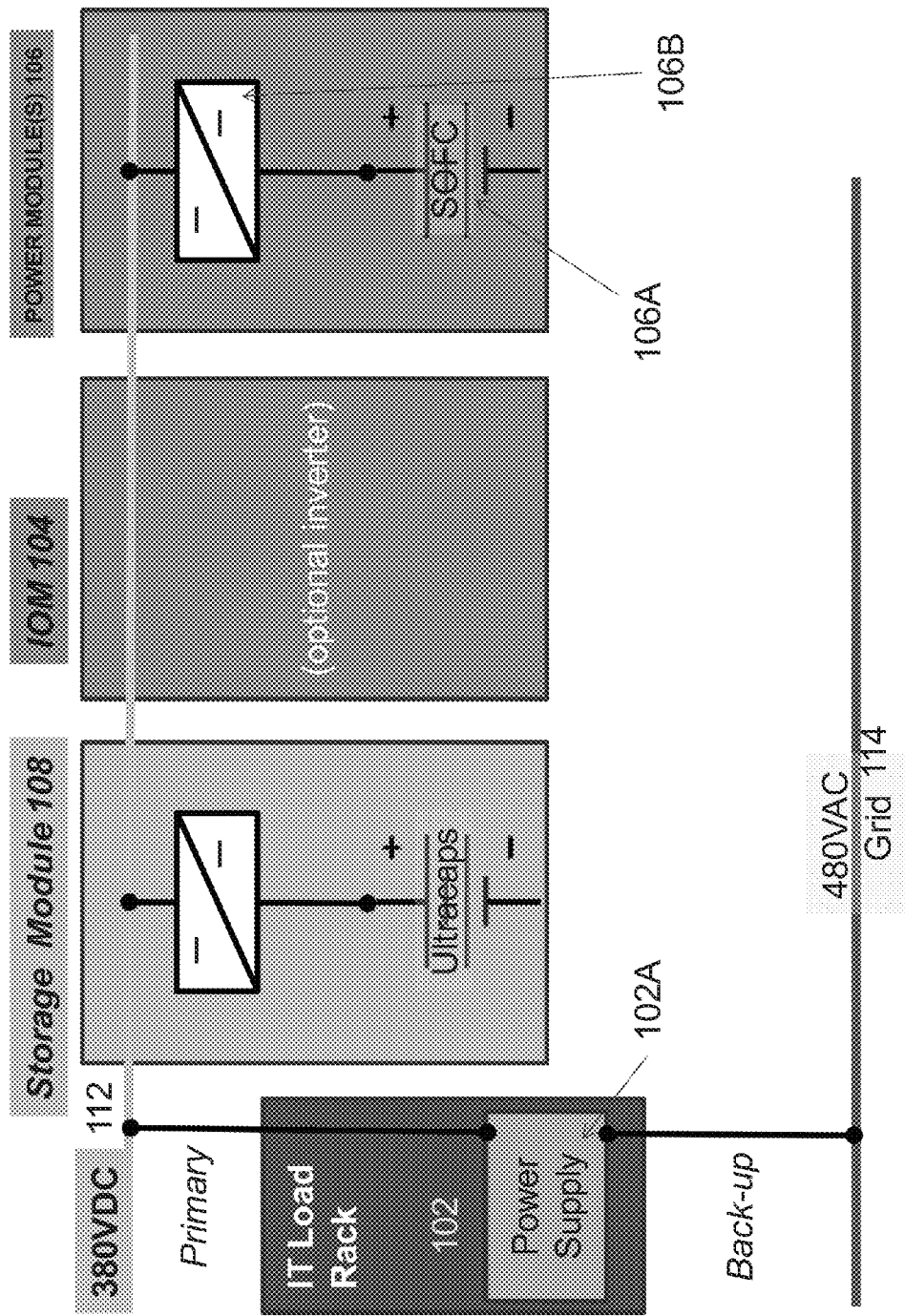
FIG. 1 is a block diagram illustrating a fuel cell system that can be used with the exemplary embodiments.

Referring to FIG. 1, one exemplary fuel cell system includes a DC load 102, such as an information technology (IT) load (i.e., devices operating in an IT system which may include one or more of computer(s), server(s), modem(s), router(s), rack(s), power supply connections, and other components found in a data center environment), an input/output module (IOM) 104, and one or more power modules 106, as described in U.S. application Ser. No. 13/937,312 incorporated herein by reference in its entirety.

The IOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc., may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators.

The segment(s) 106A of fuel cells may be connected to one or more the DC buses 112 such as a split DC bus, by one or more DC/DC converters 106B located in module 106. The DC/DC converters 106B may be located anywhere in the fuel cell system, for example in the IOM 104 instead of the power modules 106.

The system may also optionally include an energy storage module 108 including a storage device, such as a bank of supercapacitors, batteries, flywheel, etc. The storage device may also be connected to the DC bus 112 using one or more DC/DC converters as shown in FIG. 1. Alternatively, the storage devices may be located in the power module 106 and/or together with the IT load 102.

Figure 2:
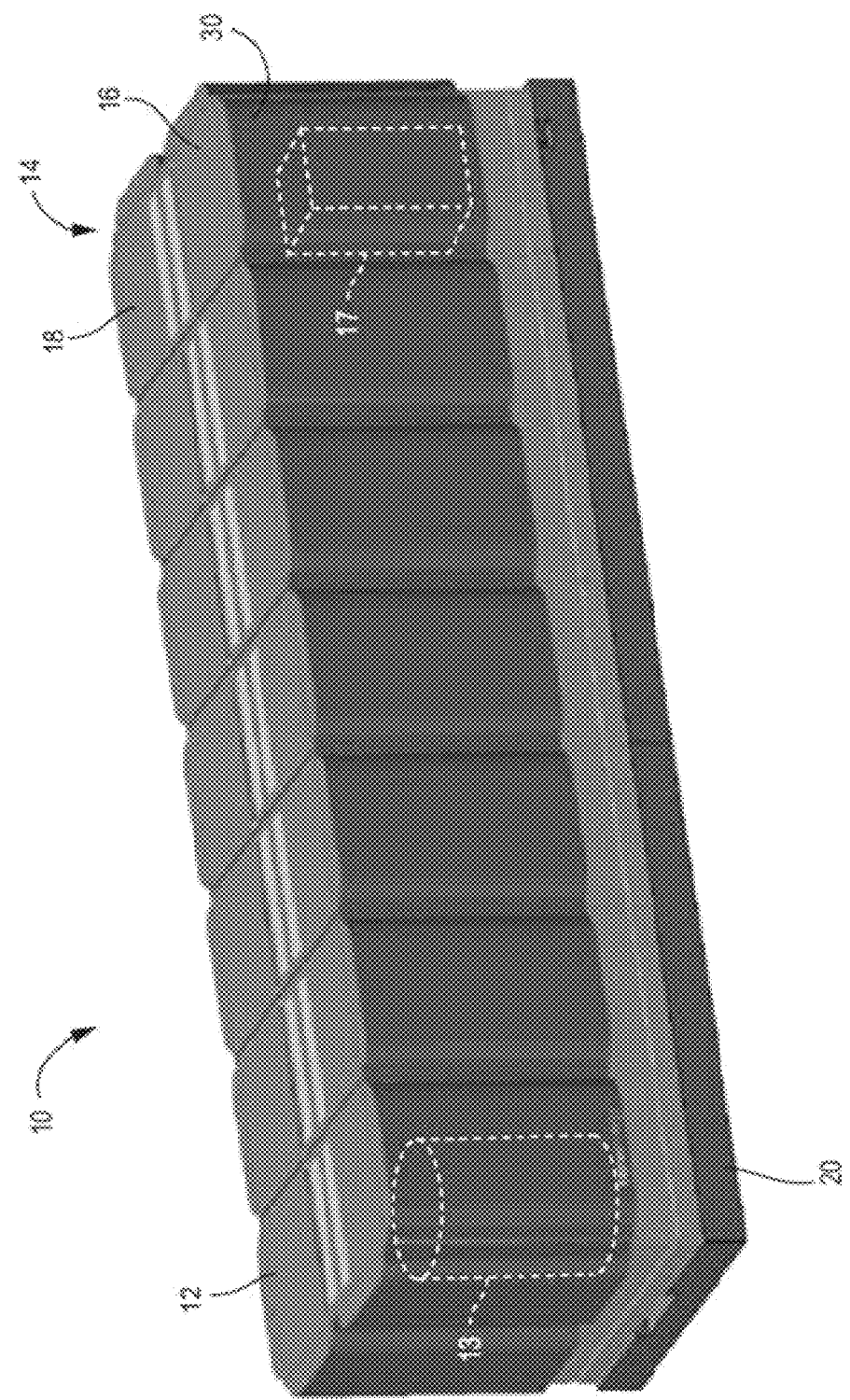
FIG. 2 is an isometric view of a modular fuel cell system enclosure that can be used with the exemplary embodiments.
Figure 5:
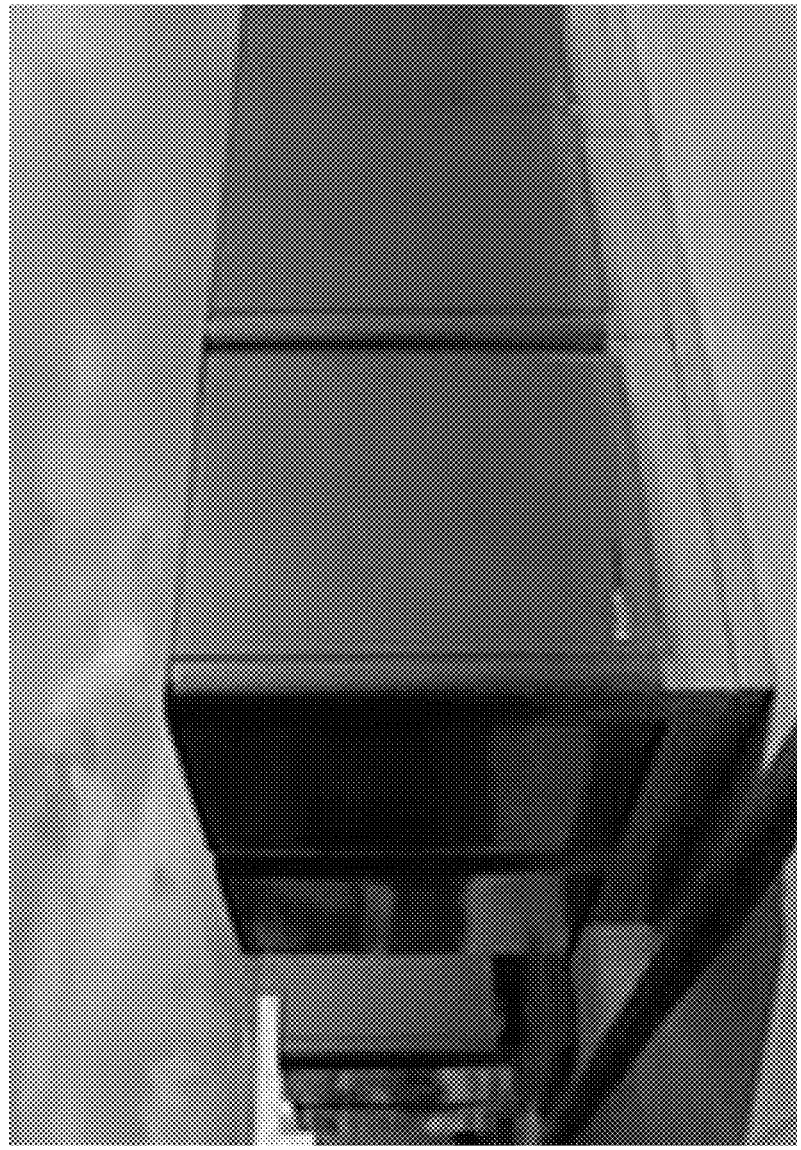
FIG. 5 is photograph of the housing of the modular fuel cell system of FIG. 2.

FIGS. 2 and 5 illustrate an exemplary modular fuel cell system described in U.S. Pat. No. 8,440,362, incorporated herein by reference in their entirety.

The modular system may contain modules and components described above as well as in U.S. patent application Ser. No. 11/656,006, filed on Jan. 22, 2007, and entitled "Modular Fuel Cell System" which is incorporated herein by reference in its entirety. The modular design of the fuel cell system enclosure 10 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

The modular fuel cell system enclosure 10 includes a plurality of power module housings 12 (containing a fuel cell power module components 70, where the housing 12 and its components 70 are jointly labeled 106 in FIG. 1), one or more fuel input (i.e., fuel processing) module housings 16, and one or more power conditioning (i.e., electrical output) module housings 18 (where the housing and its contents are labeled 104 and referred to as "IOM" in FIG. 1). For example, the system enclosure may include any desired number of modules, such as 2-30 power modules, for example 6-12 power modules. FIG. 2 illustrates a system enclosure 10 containing six power modules (one row of six modules stacked side to side), one fuel processing module, and one power conditioning module, on a common base 20. Each module may comprise its own cabinet or housing. Alternatively, as will be described in more detail below, the power conditioning (i.e., IOM) and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in one exemplary embodiment in FIG. 2, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may comprise more than one row of modules 12. For example, as noted above, the system may comprise two rows of power modules stacked back to back.

The linear array of power modules 12 is readily scaled. For example, more or fewer power modules 12 may be provided depending on the power needs of the building or other facility serviced by the fuel cell system 10. The power modules 12 and input/output modules 14 may also be provided in other ratios. For example, in other exemplary embodiments, more or fewer power modules 12 may be provided adjacent to the input/output module 14. Further, the support functions could be served by more than one input/output module 14 (e.g., with a separate fuel processing module 16 and power conditioning module 18 cabinets). Additionally, while in one embodiment, the input/output module 14 is at the end of the row of power modules 12, it could also be located in the center of a row of power modules 12.

The modular fuel cell system enclosure 10 may be configured in a way to ease servicing of the system. All of the routinely or high serviced components (such as the consumable components) may be placed in a single module to reduce amount of time required for the service person. For example, the desulfurizer material for a natural gas fueled system may be placed in a single module (e.g., a fuel processing module 16 or a combined input/output module 14 cabinet). This would be the only module cabinet accessed during routine maintenance. Thus, each module 12, 14, 16, and 18 may be serviced, repaired or removed from the system without opening the other module cabinets and without servicing, repairing or removing the other modules.

For example, as described above, the enclosure 10 can include multiple power modules 12. When at least one power module 12 is taken off line (i.e., no power is generated by the stacks in the hot box 13 in the off line module 12), the remaining power modules 12, the fuel processing module 16 and the power conditioning module 18 (or the combined input/output module 14) are not taken off line. Furthermore, the fuel cell enclosure 10 may contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 may be electrically disconnected, removed from the fuel cell enclosure 10 and/or serviced or repaired without stopping an operation of the other modules in the system, allowing the fuel cell system to continue to generate electricity. The entire fuel cell system does not have to be shut down if one stack of fuel cells in one hot box 13 malfunctions or is taken off line for servicing.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door to module 14 may be on the side rather than on the front of the cabinet.

The door 30 may open in tandem with a substantially vertical and then substantially horizontal swing (e.g., "gull-wing" style). In other words, the door 30 opens by being moved up and then at least partially over the top of the enclosure 10 in a substantially horizontal direction. The terms substantially vertical and substantially horizontal of this embodiment include a deviation of 0 to 30 degrees, such as 0 to 10 degrees from exact vertical and horizontal directions, respectively.

The door 30 is mounted on to walls of the enclosure or cabinet 10 of the module 12 or 14 with plural independent mechanical arms. In the open position the upper portion of the door 30 may be located over the enclosure or cabinet 10 and the lower portion of the door may optionally overhang the opening to the enclosure 10. In this configuration, the door 30 provides rain and snow protection for a user when open since the lower portion of the door overhangs from the fuel cell system enclosure 10. Alternatively, the entire door 30 may be located over the enclosure 10 in the open position.

Figure 3:
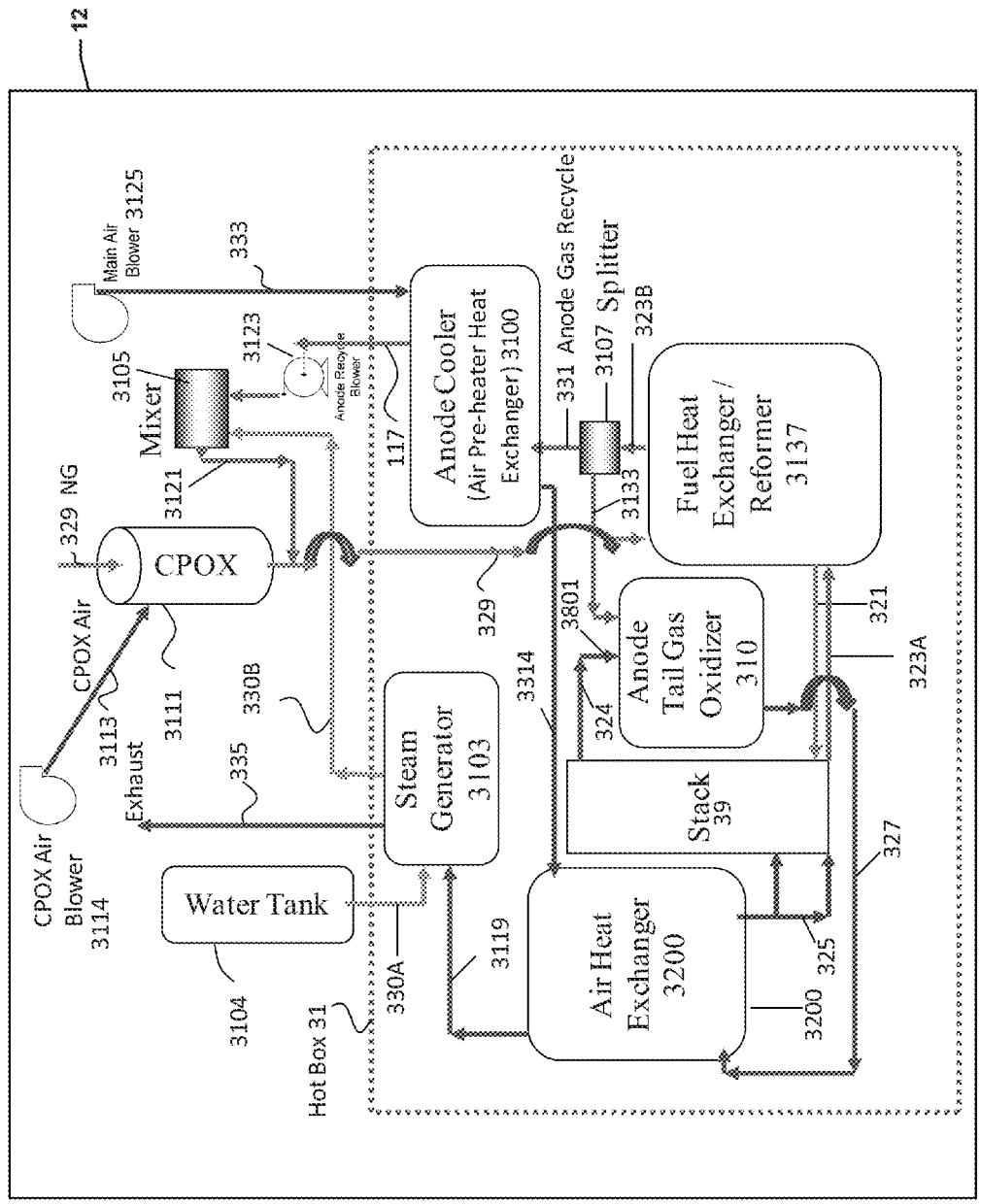
FIG. 3 s a schematic process flow diagram illustrating a hot box that can be used with the exemplary embodiments.

FIG. 3 is a schematic process flow diagram representation of module 12 and the hot box 31 components showing the various flows through the components. In the configuration illustrated in FIG. 3, there may be no fuel and air inputs to the ATO 310. External natural gas or another external fuel may not be fed to the ATO 310. Instead, the hot fuel (anode) exhaust stream from the fuel cell stack(s) 39 is partially recycled into the ATO as the ATO fuel inlet stream. Likewise, there is no outside air input into the ATO. Instead, the hot air (cathode) exhaust stream from the fuel cell stack(s) 39 is provided into the ATO as the ATO air inlet stream.

Furthermore, the fuel exhaust stream is split in a splitter 3107 located in the hot box 1. The splitter 3107 is located between the fuel exhaust outlet of the anode recuperator (e.g., fuel heat exchanger) 3137 and the fuel exhaust inlet of the anode cooler 3100 (e.g., the air pre-heater heat exchanger). Thus, the fuel exhaust stream is split between the mixer 3105 and the ATO 310 prior to entering the anode cooler 3100. This allows higher temperature fuel exhaust stream to be provided into the ATO than in the prior art because the fuel exhaust stream has not yet exchanged heat with the air inlet stream in the anode cooler 3100. For example, the fuel exhaust stream provided into the ATO 310 from the splitter 3107 may have a temperature of above 350 C, such as 350-500 C, for example 375 to 425 C, such as 390-410 C. Furthermore, since a smaller amount of fuel exhaust is provided into the anode cooler 3100 (e.g., not 100% of the anode exhaust is provided into the anode cooler due to the splitting of the anode exhaust in splitter 3107), the heat exchange area of the anode cooler 3100 may be reduced.

The hot box 31 contains the plurality of the fuel cell stacks 39, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 39 may be arranged over each other in a plurality of columns or segments.

The hot box 31 also contains a steam generator 3103. The steam generator 3103 is provided with water through conduit 330A from a water source 3104, such as a water tank or a water pipe (i.e., a continuous water supply), and converts the water to steam. The steam is provided from generator 3103 to mixer 3105 through conduit 330B and is mixed with the stack anode (fuel) recycle stream in the mixer 3105. The mixer 3105 may be located inside or outside the hot box of the hot box 31. Preferably, the humidified anode exhaust stream is combined with the fuel inlet stream in the fuel inlet line or conduit 329 downstream of the mixer 3105, as schematically shown in FIG. 3. Alternatively, if desired, the fuel inlet stream may also be provided directly into the mixer 3105, or the steam may be provided directly into the fuel inlet stream and/or the anode exhaust stream may be provided directly into the fuel inlet stream followed by humidification of the combined fuel streams.

The steam generator 3103 is heated by the hot ATO 310 exhaust stream which is passed in heat exchange relationship in conduit 3119 with the steam generator 3103.

The system operates as follows. The fuel inlet stream, such as a hydrocarbon stream, for example natural gas, is provided into the fuel inlet conduit 329 and through a catalytic partial pressure oxidation (CPOx) reactor 3111 located outside the hot box. During system start up, air is also provided into the CPOx reactor 3111 through CPOx air inlet conduit 3113 to catalytically partially oxidize the fuel inlet stream. The air may be blown through the air inlet conduit 3113 to the CPOx reactor 3111 by a CPOx air blower 3114. The CPOx air blower 3114 may only operate during startup. During steady state system operation, the air flow is turned off (e.g., by powering off the CPOx air blower 3114) and the CPOx reactor acts as a fuel passage way in which the fuel is not partially oxidized. Thus, the hot box 31 may comprise only one fuel inlet conduit which provides fuel in both start-up and steady state modes through the CPOx reactor 3111. Therefore a separate fuel inlet conduit which bypasses the CPOx reactor during steady state operation is not required.

The fuel inlet stream is provided into the fuel heat exchanger (anode recuperator)/pre-reformer 3137 where its temperature is raised by heat exchange with the stack 39 anode (fuel) exhaust streams The fuel inlet stream is pre-reformed in the pre-reformer section of the heat exchanger 3137 via the SMR reaction and the reformed fuel inlet stream (which includes hydrogen, carbon monoxide, water vapor and unreformed methane) is provided into the stacks 39 through the fuel inlet conduit(s) 321. The fuel inlet stream travels upwards through the stacks through fuel inlet risers in the stacks 39 and is oxidized in the stacks 39 during electricity generation. The oxidized fuel (i.e., the anode or fuel exhaust stream) travels down the stacks 39 through the fuel exhaust risers and is then exhausted from the stacks through the fuel exhaust conduits 323A into the fuel heat exchanger 3137.

In the fuel heat exchanger 3137, the anode exhaust stream heats the fuel inlet stream via heat exchange. The anode exhaust stream is then provided via the fuel exhaust conduit 323B into a splitter 3107. A first portion of the anode exhaust stream is provided from the splitter 3107 the ATO 310 via conduit (e.g., slits) 3133.

A second portion of the anode exhaust stream is recycled from the splitter 3107 into the anode cooler 3100 and then into the fuel inlet stream. For example, the second portion of the anode exhaust stream is recycled through conduit 331 into the anode cooler (i.e., air pre-heater heat exchanger) where the anode exhaust stream pre-heats the air inlet stream from conduit 333. The anode exhaust stream is then provided by the anode recycle blower 3123 into the mixer 3105. The anode exhaust stream is humidified in the mixer 3105 by mixing with the steam provided from the steam generator 3103. The humidified anode exhaust stream is then provided from the mixer 3105 via humidified anode exhaust stream conduit 3121 into the fuel inlet conduit 329 where it mixes with the fuel inlet stream.

The air inlet stream is provided by a main air blower 3125 from the air inlet conduit 333 into the anode cooler heat exchanger 3100. The blower 3125 may comprise the single air flow controller for the entire system, as described above. In the anode cooler heat exchanger 3100, the air inlet stream is heated by the anode exhaust stream via heat exchange. The heated air inlet stream is then provided into the air heat exchanger (cathode recuperator) 3200 via conduit 3314. The heated air inlet stream is provided from heat exchanger 3200 into the stack(s) 39 via the air inlet conduit and/or manifold 325.

The air passes through the stacks 39 into the cathode exhaust conduit 324 and through conduit 324 and mixer 3801 into the ATO 310. In the ATO 310, the air exhaust stream oxidizes the split first portion of the anode exhaust stream from conduit 3133 to generate an ATO exhaust stream. The ATO exhaust stream is exhausted through the ATO exhaust conduit 327 into the air heat exchanger 3200. The ATO exhaust stream heats air inlet stream in the air heat exchanger 3200 via heat exchange. The ATO exhaust stream (which is still above room temperature) is then provided from the air heat exchanger 3200 to the steam generator 3103 via conduit 3119. The heat from the ATO exhaust stream is used to convert the water into steam via heat exchange in the steam generator 3103. The ATO exhaust stream is then removed from the system via the exhaust conduit 335. Thus, by controlling the air inlet blower output (i.e., power or speed), the magnitude (i.e., volume, pressure, speed, etc.) of air introduced into the system may be controlled. The cathode (air) and anode (fuel) exhaust streams are used as the respective ATO air and fuel inlet streams, thus eliminating the need for a separate ATO air and fuel inlet controllers/blowers. Furthermore, since the ATO exhaust stream is used to heat the air inlet stream, the control of the rate of single air inlet stream in conduit 333 by blower 3125 can be used to control the temperature of the stacks 39 and the ATO 310.

Thus, as described above, by varying the main air flow in conduit 333 using a variable speed blower 3125 and/or a control valve to maintain the stack 39 temperature and/or ATO 310 temperature. In this case, the main air flow rate control via blower 3125 or valve acts as a main system temperature controller. Furthermore, the ATO 310 temperature may be controlled by varying the fuel utilization (e.g., ratio of current generated by the stack(s) 39 to fuel inlet flow provided to the stack(s) 39). Finally the anode recycle flow in conduits 331 and 3117 may be controlled by a variable speed anode recycle blower 3123 and/or a control valve to control the split between the anode exhaust to the ATO 310 and anode exhaust for anode recycle into the mixer 3105 and the fuel inlet conduit 329.

Figure 4:
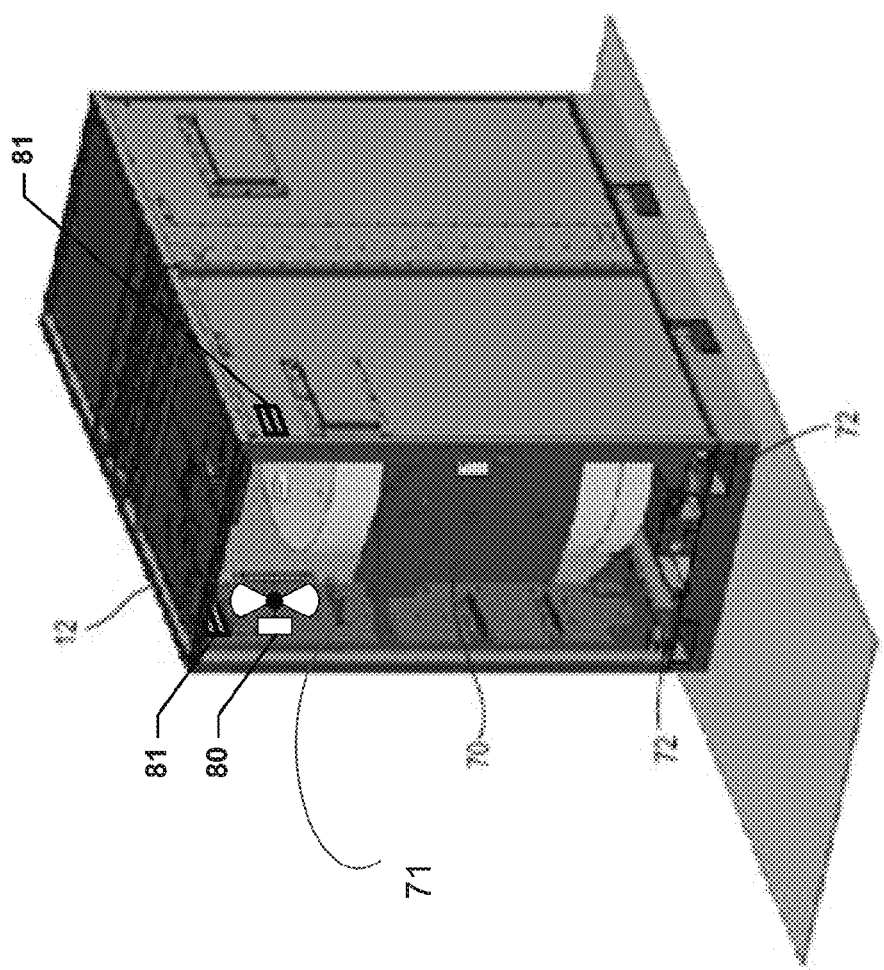
FIG. 4 is an isometric view of a hot box of the modular fuel cell system of FIG. 2.

As shown in FIG. 4, field replaceable power module components (PMC) 70 include the hot box sub-system 13, such as the cylindrical hot box 13 that is shown in FIG. 2. The hot box 13 contains the fuel cell stacks and heat exchanger assembly. The PMC 70 also includes a frame 71 supporting the balance of plant (BOP) sub-system including blowers, valves, and control boards, etc (not shown for clarity) and a removable support 72, such as fork-lift rails, which supports the hot box and the frame. The support 72 allows the PMC 70 to be removed from the power module 12 cabinet as a single unit or assembly. Other configurations may also be used. For example, the hot box 13 may have a shape other than cylindrical, such as polygonal, etc. The support 72 may comprise a platform rather than rails. The frame may have a different configuration or it may be omitted entirely with the BOP components mounted onto the hotbox 13 and/or the support 72 instead. The PMC 70 is dimensionally smaller than the opening in the power module 12 (e.g., the opening closed by the door 30). Additionally, the PMC 70 may include one or more vents 81 for exhausting/ventilating gas, such as air, from within the PMC and module 12 to the outside environment. The PMC 70 may also include one or more ventilation fans or blowers 80, such as a ventilation fan driven by an alternating current motor that may force gas, such as air and/or ATO exhaust, out of the PMC 70, such as out of the one or more vents 81.

To maximize the efficiency and/or longevity of fuel cell stacks, such as the fuel stacks within power module 12 discussed above, proper operating conditions must be maintained. For example, inefficient operation may result if too much or too little fuel is used by the fuel system, or if temperatures of the individual fuel cells of a fuel cell stack deviate from a preferred temperature range. In order to maintain proper operating conditions, it is desirable to continually monitor and adjust the fuel cell system, its support equipment (e.g., support equipment such as blowers, pumps, valves, etc.), and peripheral devices connected to the fuel cell system.

The systems, methods, and devices of the various embodiments enable electrochemical impedance spectroscopy ("EIS") (also called AC impedance spectroscopy) to be performed on electrochemical devices by power electronics connecting the electrochemical devices in parallel to a common load and/or bus. Electrochemical devices may include fuel cell stack segments, battery cells, electrolysis cells, electrochemical pumping cells (e.g., hydrogen separators), or any other device that may be monitored by EIS.

EIS enables the overall impedance of an electrochemical device to be determined by measuring a voltage or current across the electrochemical device at varying sampling frequencies. A testing waveform selected to achieve the varying sampling frequencies, such as a waveform with oscillations of approximately 1 Hz, may be generated on a line connected to the electrochemical device, for example by rapid switching of the line to load and unload the electrochemical device, thereby injecting the test waveform into the electrochemical device. The testing waveform may be a sine wave or other type wave selected to achieve desired sampling frequencies. A voltage or current and resulting phase angle of the electrochemical device may be determined at each of the sampling frequencies, and using EIS converted into impedances.

Results of the EIS procedure (e.g., the impedance at varying frequencies) may be graphically represented using a Nyquist plot or Bode plot and characteristics of the electrochemical device may be determined based on the impedance response of the electrochemical device. By comparing the impedance response of the electrochemical device being measured to known signatures of impedance responses of electrochemical devices with known characteristics, the characteristics of the measured device may be identified. Characteristics of the electrochemical device that may be determined based at least in part on the impedance response include fuel conditions (e.g., fuel utilization rate), air conditions (e.g., an air utilization rate), catalyst conditions (e.g., cracks in anode catalyst coatings), and water conditions (e.g., PEM fuel cell membrane water flooding). Based on the characteristics of the electrochemical device a setting of the electrochemical device may be adjusted. For example, based on the fuel utilization rate and/or water flow rate, a fuel flow and/or water flow into the fuel inlet stream setting for fuel provided to the electrochemical device may be adjusted. Additionally, determined characteristics of the electrochemical device may be compared to a failure threshold, and when the characteristics exceed the failure threshold, a failure mode of the electrochemical device may be indicated, such as a fuel starvation state, a catalyst poisoning state, or a water flooding state.

In an embodiment, the power electronics connected to each electrochemical device of a group of two or more electrochemical devices may compensate for any ripple generated during EIS such that no ripple or a reduced ripple is realized at the common load and/or bus. As one power electronics injects the test waveform into its respective electrochemical device, a resulting ripple from that power electronics may be applied to the load and/or bus. To counteract this ripple from the power electronics performing EIS monitoring, an offsetting (or canceling) ripple or ripples may be generated by one or more of the other power electronics. To generate the offsetting (or canceling) ripple or ripples one or more of the other power electronics not presently performing EIS monitoring may inject an offset waveform toward their respective electrochemical device resulting in an offsetting ripple being applied to the common load and/or bus connected in parallel to the electrochemical devices. The sum of the ripple from the power electronics performing EIS monitoring and the offsetting ripple or ripples from the one or more other power electronics may be a DC output resulting in no ripple at the load and/or common bus.

In another embodiment, other devices connected to the common load and/or bus may compensate for any ripple generated during EIS such that no ripple or a reduced ripple is realized at the common load and/or bus. As discussed above, as one power electronics injects the test waveform into its respective electrochemical device, a resulting ripple from that power electronics may be applied to the load and/or bus. To counteract this ripple from the power electronics performing EIS monitoring, an offsetting (or canceling) ripple or ripples may be generated by one or more other device, such as a waveform generator, and injected into the common load and/or bus. To generate the offsetting (or canceling) ripple or ripples one or more other device may apply an offset ripple to the common load and/or bus connected in parallel to the electrochemical devices. The sum of the ripple from the power electronics performing EIS monitoring and the offsetting ripple or ripples applied by the other device may be a DC output resulting in no ripple at the load and/or common bus.

In an embodiment, during EIS monitoring the impedance of a segment may be determined as the polar form voltage of the segment over the polar form current of the segment. This may enable a Fourier series calculation to be used to allow for analysis of an imperfect sinusoidal ripple at the fundamental frequency without needing to calculate a full Fast Fourier Transform. This may increase the accuracy of the impedance calculation and decrease the processing time required to determine an impedance response in comparison to impedance determinations made using a full Fast Fourier Transform.

In an embodiment, energy storage devices may be included on the power electronics connected to each electrochemical device. Energy storage devices may be any type energy storage devices, such as capacitors, supercapacitors, batteries, etc. In various embodiments, the energy storage devices may be on the output, the input, or windings of the transformer of the power electronics to store ripple energy and discharge the ripple energy out of phase. The energy storage device may reduce the ripple current, or eliminate the ripple current, passing to the bus. The ability to reduce and/or eliminate the ripple current resulting from EIS testing may enable EIS testing using test waveforms with higher frequencies than may be used without the energy storage devices. For example, test waveforms with frequencies at or above 400 Hz may be used, greatly extending the bandwidth of the power electronics to create and analyze test waveforms. Without the energy storage devices the bandwidth of the test waveform frequencies may be practically limited to frequencies less than the switching frequency of the power electronics. With the energy storage devices, the bandwidth of the test waveform frequencies may extend to frequencies greater than the switching frequency of the power electronics.

In a specific embodiment, the electrochemical devices may be one or more fuel cell stack segments, such as one, two, three, four, or more fuel cell stack segments, and the power electronics devices may be DC to DC converters. The fuel cell stack segments may be segments of solid oxide fuel cells, proton exchange membrane fuel cells, phosphoric acid fuel cells, molten carbonate fuel cells, or other type fuel cells. For example, the fuel cell stack segments may be fuel cell stack segments of fuel cells 106A and the DC to DC converters may be DC to DC converters 106B described above.

Figure 6:
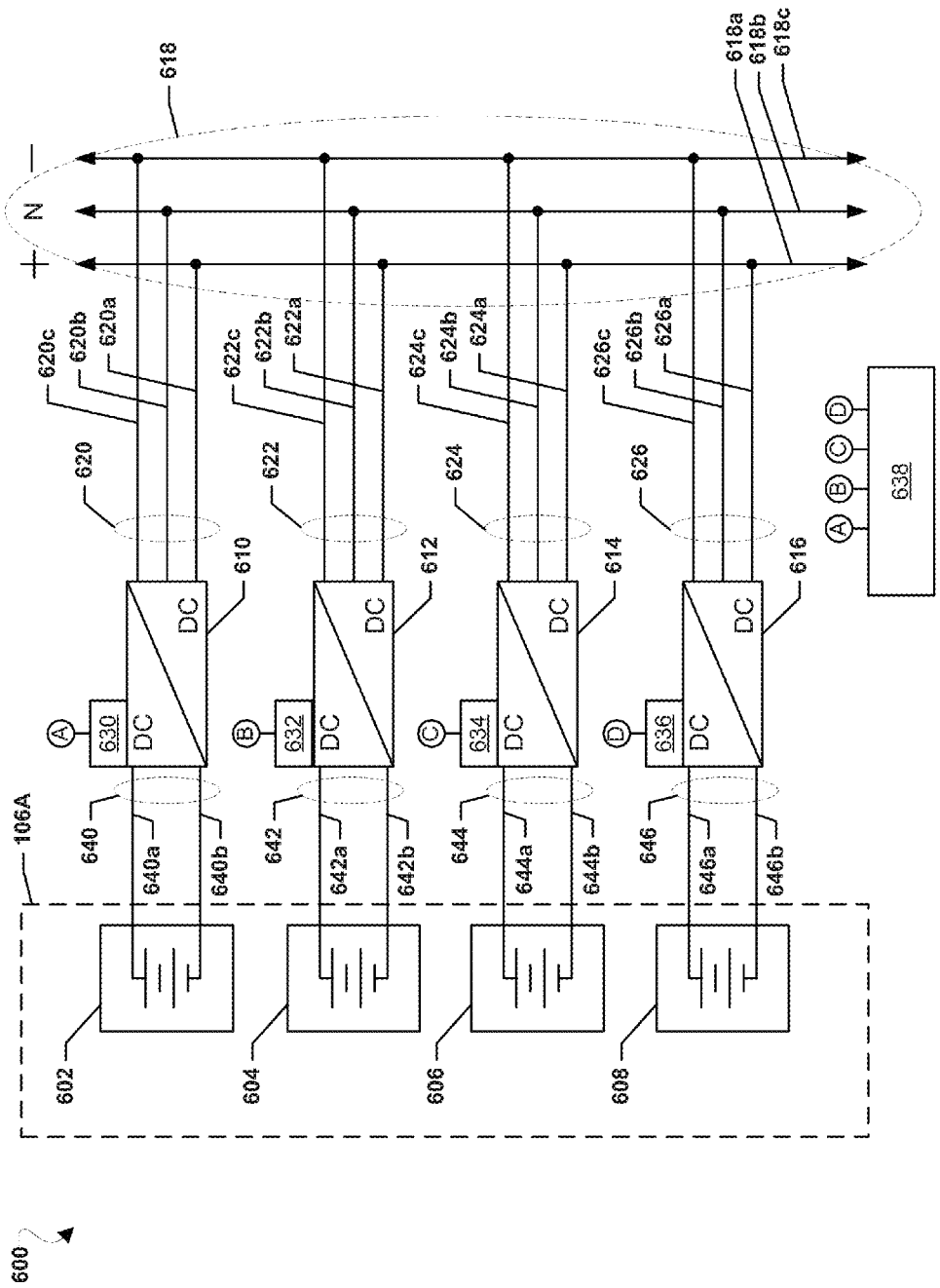
FIG. 6 is a block diagram of a system according to an embodiment.

FIG. 6 is a block diagram of a system 600 according to an embodiment. The system 600 may include four electrochemical devices 602, 604, 606, and 608. For example, the electrochemical devices 602, 604, 606, and 608 may each be fuel cell stack segments of fuel cells which may constitute a portion 106A of power module 106. Each electrochemical device 602, 604, 606, and 608 may be electrically connected via a respective input connection 640, 642, 644, and 646 to a respective one of power electronics 610, 612, 614, and 616. Each input connection 640, 642, 644, and 646 may comprise a respective positive input connection 640a, 642a, 644a, and 644b as well as a respective negative input connection 640b, 642b, 644b, and 646b. In operation, the electrochemical devices 602, 604, 606, and 608 may output DC voltages to their respective power electronics 610, 612, 614, and 616 via their respective input connections 640, 642, 644, and 646.

The power electronics 610, 612, 614, and 616 may be DC to DC converters, for example 380 volt 23 amp DC to DC converters. The power electronics 610, 612, 614, and 616 may be each include controllers 630, 632, 634, and 636, respectively, each connected, wired or wirelessly, to a central controller 638. The controllers 630, 632, 634, and 636 may be processors configured with processor-executable instructions to perform operations to control their respective power electronics 610, 612, 614, and 616, and the controller 638 may be a processor configured with processor-executable instructions to perform operations to exchange data with and control the operations of power electronics 610, 612, 614, and 616 via their respective controllers 630, 632, 634, and 636. Via the connections A, B, C, and D between the controllers 630, 632, 634, 636 connected to the power electronics 610, 612, 614, and 616 and controller 638, the controller 638 may be effectively connected to the power electronics 610, 612, 614, and 616 and control the operations of the power electronics 610, 612, 614, and 616.

The power electronics 610, 612, 614, and 616 may be connected in parallel to a DC bus 618 by their respective output connections 620, 622, 624, and 626. In an embodiment, the DC bus 618 may be a three phase bus comprised of a positive line 618a, a neutral line 618b, and a negative line 618c, and the respective output connections 620, 622, 624, and 626 may include respective positive output connections 620a, 622a, 624a, and 626a, respective neutral output connections 620b, 622b, 624b, and 626b, and respective negative output connections 620c, 622c, 624c, and 626c. In operation, the power electronics 610, 612, 614, and 616 may output DC voltages to the bus 618 via their respective output connections 620, 622, 624, and 626. In an embodiment, power electronics 610, 612, 614, and 616 may be three phase converters configured to receive positive and negative DC inputs from their respective electrochemical devices 602, 604, 606, and 608 and output positive DC, negative DC, and neutral outputs to the bus 618 via their respective positive output connections 620a, 622a, 624a, and 626a, respective neutral output connections 620b, 622b, 624b, and 626b, and respective negative output connections 620c, 622c, 624c, and 626c. In an alternative embodiment, power electronics 610, 612, 614, and 616 may each be comprised of dual two phase converters. The positive output of the first of the two phase converters may be connected to the positive line 618a of the bus 618 and the negative output of the second of the two phase converters may be connected to the negative line 618c of the bus 618. The negative output of the first of the two phase converters and the positive output of the second of the two phase converters may be connected together to the neutral line 618b of the bus 618.

In an embodiment, the power electronics 610, 612, 614, and 616 may each be configured to perform EIS monitoring of their respective electrochemical device 602, 604, 606, and 608. Controller 638 may select a test waveform for use in EIS monitoring for one of the electrochemical devices 602, 604, 606, or 608, and may control that power electronics 610, 612, 614, or 616 of that electrochemical device 602, 604, 606, or 608 to inject the selected test waveform onto the respective input connection 640, 642, 644, or 646. For example, the controller 638 may send an indication of the selected test waveform to the controller 630 of power electronics 610 to cause opening and closing of a switch at the power electronics 610 to generate the selected test waveform via pulse width modulation on the input connection 640 of connected to the electrochemical device 602. The power electronics 610, 612, 614, or 616 injecting the test waveform may be configured to monitor the resulting impedance response of its respective electrochemical device 602, 604, 606, or 608, and via its respective controller 630, 632, 634, or 636 may output an indication of the monitored impedance response to the controller 638. Continuing with the preceding example, power electronics 610 may monitor the impedance response on the input connection 640 to the electrochemical device 602 and the controller 630 may indicate the impedance response of electrochemical device 602 to the controller 638.

Controller 638 may use the impedance response determined by EIS monitoring of an electrochemical device 602, 604, 606, 608 to determine a characteristic of that electrochemical device 602, 604, 606, 608 and may adjust a setting of the system 600 based on the determined characteristic. For example, the controller 638 may determine the impedance response according to method 1000 described further below with reference to FIG. 10. The controller 638 may compare the impedance response determined by EIS monitoring of an electrochemical device 602, 604, 606, 608, such as a plot of the impedance response and/or stored impedance values, to impedance responses stored in a memory, such as stored plots of impedance responses and/or stored impedance values, of similar electrochemical devices correlated with known characteristics. The controller 638 may compare the impedance response determined by EIS monitoring of an electrochemical device 602, 604, 606, 608 to the stored impedance responses in any manner to identify matches between the impedance responses determined by EIS monitoring of an electrochemical device 602, 604, 606, 608 and the stored impedance responses.

When the controller 638 determines a match (e.g., identically or within some predetermined variance value) between the impedance response determined by EIS monitoring of an electrochemical device 602, 604, 606, 608 and a stored impedance response, the controller 638 may determine the characteristic correlated with the stored impedance response to be the characteristic of the respective electrochemical device 602, 604, 606, 608. For example, the controller 638 may determine a fuel utilization rate and/or steam to carbon ratio in the fuel inlet stream of the electrochemical device 602 based on EIS monitoring and may adjust a fuel flow setting and/or water input into the fuel inlet steam setting of the system 600 based on the determined fuel utilization rate by adjusting blower 3123 or fuel input line 329 or water flow from 3104 into steam generator 3103. As another example, the controller 638 may determine an air utilization rate of the electrochemical device 604 based on EIS monitoring and may adjust an air flow setting of the system 600 based on the determined air utilization rate by adjusting the air blower 3125 illustrated in FIG. 3. As other examples, EIS monitoring may enable a determined characteristics of the electrochemical devices 602, 604, 606, or 608 to be compared to a failure threshold, and when the characteristics exceed the failure threshold a failure mode of the electrochemical device 602, 604, 606, or 608 may be indicated, such as a fuel starvation state (e.g., insufficient fuel at the anode), anode catalyst damage or poisoning state (e.g., by carbon and/or sulfur build up on the anode, anode catalyst cracking, etc.), or a water flooding state (e.g., in a PEM fuel cell) which may result in the fuel and/or water flow into the system being adjusted or may result in the shut off of the system.

When a test waveform is injected on an input connection 640, 642, 644, or 646 by a respective power electronics 610, 612, 614, or 616 to perform EIS monitoring, a ripple on the respective output connection 620, 622, 624, or 626 may occur. If unaccounted for, the resulting ripple from the power electronics 610, 612, 614, or 616 performing EIS monitoring may cause an undesired ripple on the DC bus 618. To prevent a ripple on the DC bus 618, the ripple from the power electronics 610, 612, 614, or 616 performing EIS monitoring may be offset or canceled by other ripples injected into the DC bus 618. In an embodiment, the other ripples may be generated by one or more of the other power electronics 610, 612, 614, or 616 not performing EIS monitoring. The ripples from one or more of the other power electronics 610, 612, 614, or 616 not performing EIS monitoring may be generated by controlling the one or more of the other power electronics 610, 612, 614, or 616 not performing EIS monitoring to inject an offset waveform into their respective input connections to their respective input connections 640, 642, 644, or 646. The offset waveform or waveforms may be selected by the controller 638 such that the ripples on the respective output connections 620, 622, 624, or 626 generated in response to injecting the offset waveform or waveforms cancels the ripple caused by the power electronics 610, 612, 614, or 616 performing EIS monitoring when the waveforms are summed at the DC bus 618. In another embodiment, ripples may be injected into output connections 620, 622, 624, or 626 from devices other than the power electronics 610, 612, 614, or 616 to cancel the ripple caused by the power electronics 610, 612, 614, or 616 performing EIS monitoring when the waveforms are summed at the DC bus 618. For example, a waveform generator may be connected to output connections 620, 622, 624, or 626 to inject canceling ripples in response to EIS monitoring.

Figure 7A:
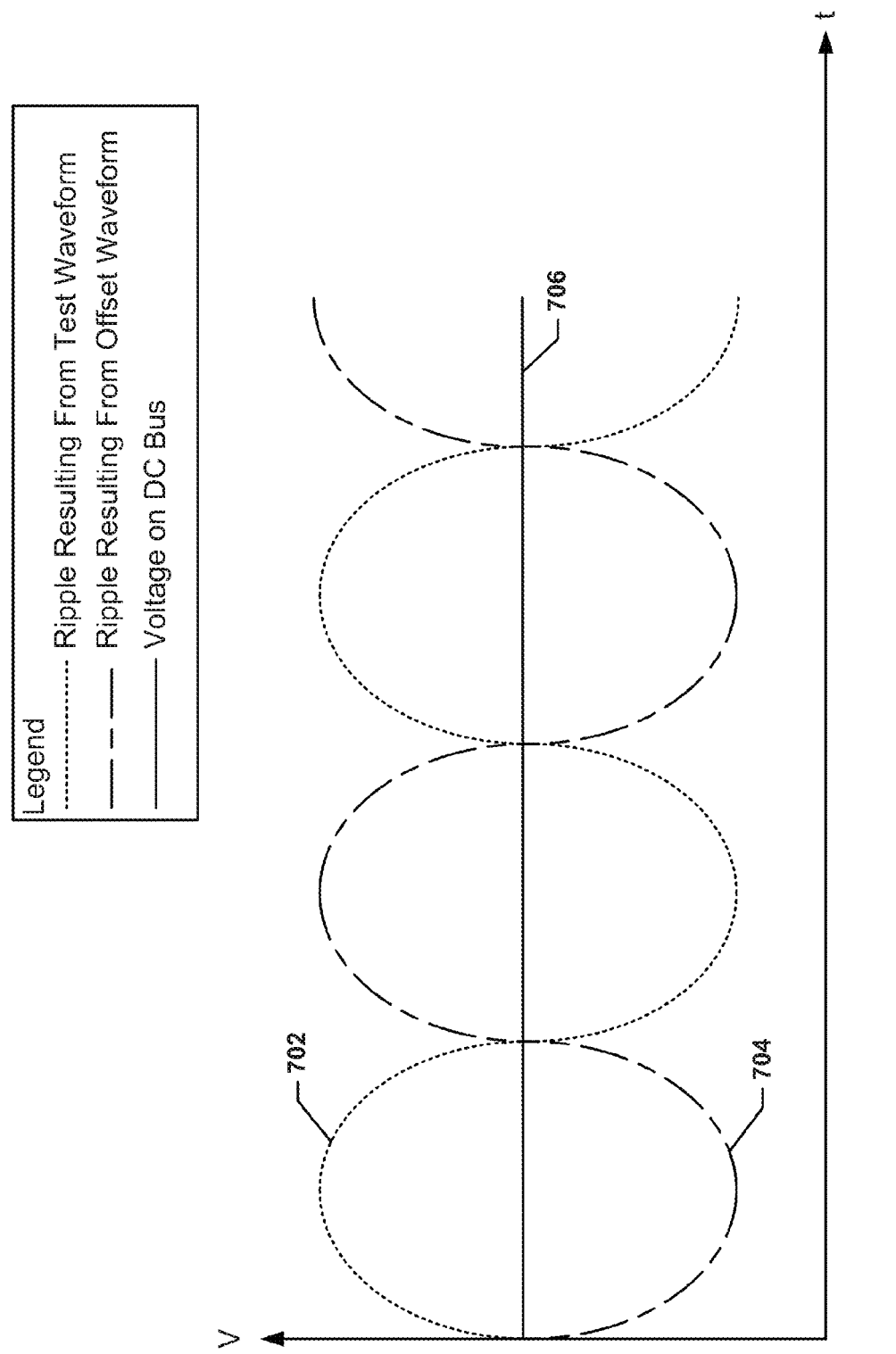
FIGS. 7A and 7B are graphs illustrating canceling ripples on a DC bus over time.

FIG. 7A is a graph illustrating canceling ripples on a DC bus over time. A test waveform injected onto an input connection of an electrochemical device by a power electronics may result in a ripple 702 sent from the power electronics injecting the test waveform toward a DC bus. An offset waveform injected onto an input connection of another electrochemical device by another power electronics may result in a ripple 704 sent from that power electronics injecting the offset waveform toward the DC bus. The offset waveform may be selected such that the ripple 704 is 180 degrees out of phase with the ripple 702. The power electronics may be connected to the DC bus in parallel and the sum of the ripple 702 and the ripple 704 may cancel each other out such that the sum of the waveforms is the desired DC voltage 706 on the DC bus.

Figure 7B:
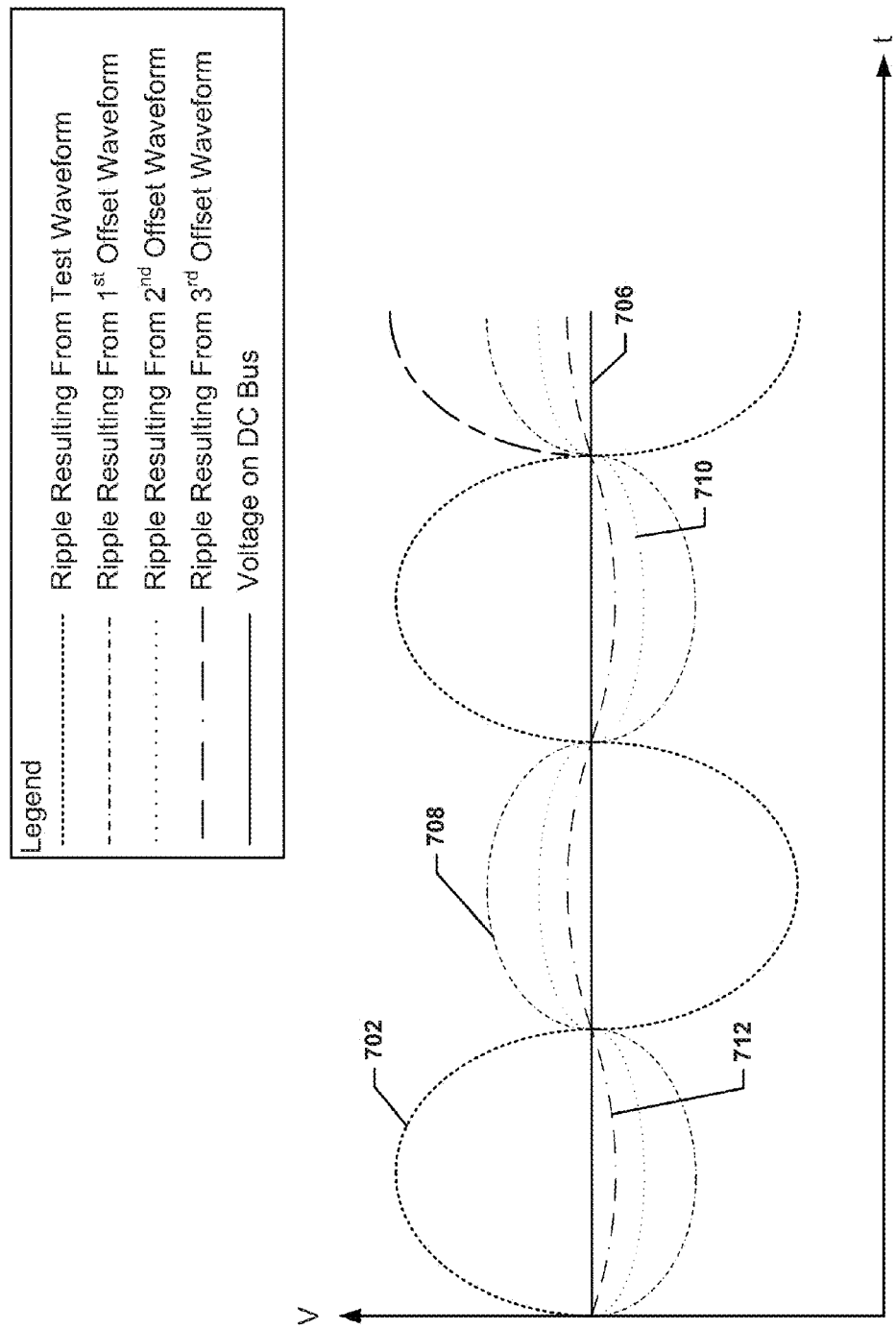

FIG. 7B is another graph illustrating canceling ripples on a DC bus over time using more than one offsetting waveform. As discussed above, a test waveform injected onto an input connection of an electrochemical device by a power electronics may result in a ripple 702 sent from the power electronics injecting the test waveform toward a DC bus. Three other power electronics may be used to generate offset waveforms injected onto input connections of three other electrochemical devices. The first offset waveform injected onto an input connection of a first other electrochemical device by the first other power electronics may result in a ripple 708 sent from that first other power electronics injecting the offset waveform toward the DC bus. The second offset waveform injected onto an input connection of a second other electrochemical device by the second other power electronics may result in a ripple 710 sent from that second other power electronics injecting the offset waveform toward the DC bus. The third offset waveform injected onto an input connection of a third other electrochemical device by the third other power electronics may result in a ripple 712 sent from that third other power electronics injecting the offset waveform toward the DC bus. The three offset waveforms may be selected such that the sum of the ripples 708, 710, and 712 may cancel ripple 702 such that the sum of the waveforms is the desired DC voltage 706 on the DC bus. While illustrated in FIGS. 7A and 7B as one generated offsetting ripple 704 or three offsetting ripples 708, 710, 712 with the same frequency as the ripple 702, more or less offsetting ripples, with different waveforms, different frequencies, phases, amplitudes, etc. may be generated and injected toward the DC bus as long as the total of any offsetting ripples plus the ripple 702 sent from the power electronics injecting the test waveform toward the DC bus results in the desired DC voltage 706 on the DC bus with no ripple.

Figure 8:
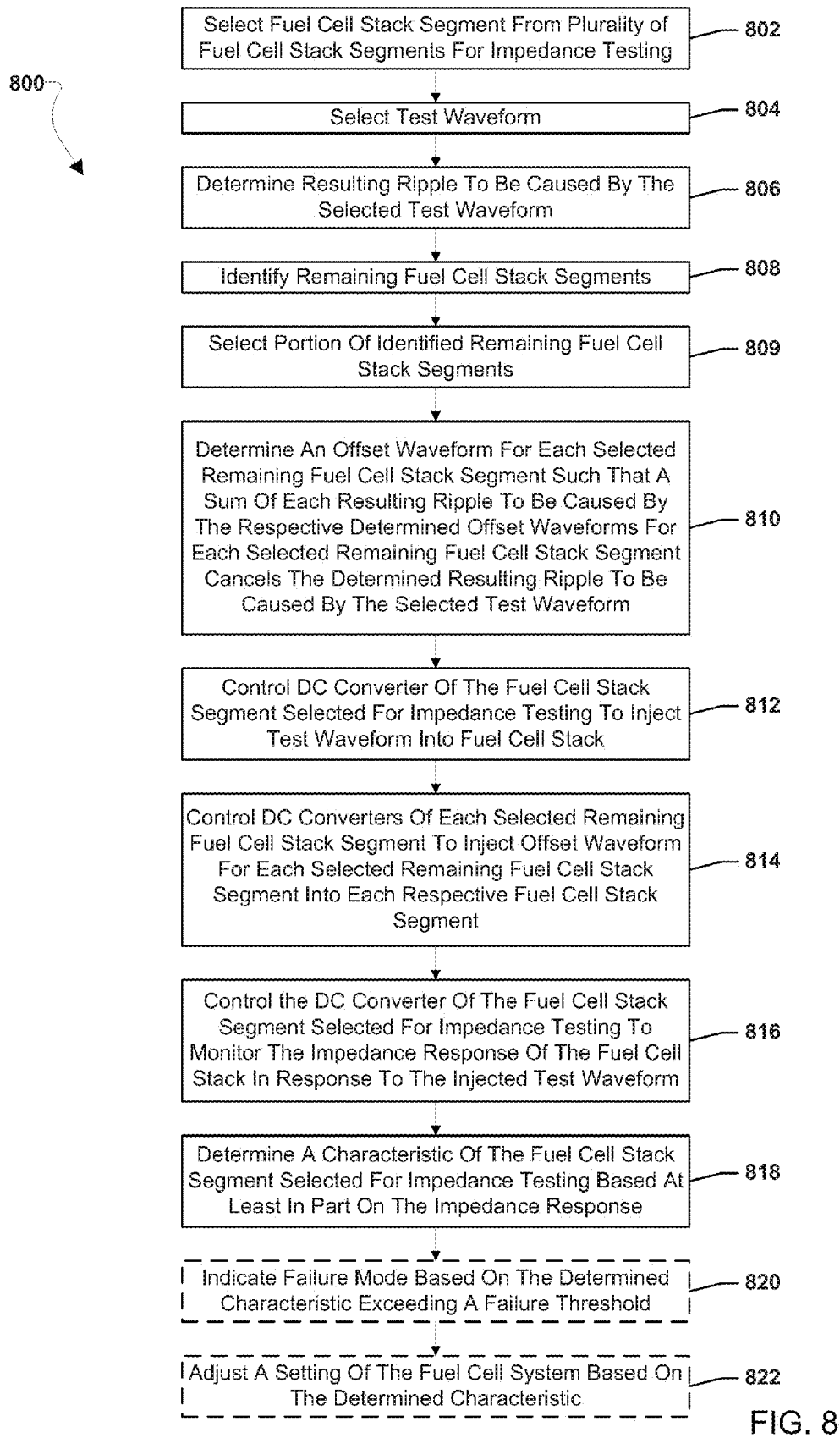
FIG. 8 is a process flow diagram illustrating an embodiment method for canceling the ripple to a DC bus caused by a test waveform.

FIG. 8 illustrates an embodiment method 800 for canceling the ripple to a DC bus caused by a test waveform. In an embodiment, the operations of method 800 may be performed by a controller, such as controller 638. The operations of method 800 are discussed in terms of fuel cell stack segments and DC converters, but fuel cell stack segments and converters are used merely as examples. Other electrochemical devices and/or other power electronics may be used in the various operations of method 800.

In block 802 the controller 638 may select a fuel cell stack segment from a plurality of fuel cell stack segments for impedance testing. For example, the fuel cell stack segment may be selected based on a testing protocol governing when and in what order fuel cell stack segments may be tested. In block 804 the controller 638 may select a test waveform. The test waveform may selected to generate necessary oscillations for EIS monitoring, such as oscillations of approximately 1 Hz.

In block 806 the controller 638 may determine a resulting ripple to be caused by the selected test waveform. As discussed above, the resulting ripple may be the ripple output to the DC bus from the DC converter injecting the test waveform. In block 808 the controller 638 may identify the remaining fuel cell stack segments. The remaining fuel cell stack segments may be the fuel cell stack segments not selected for impedance testing. In block 810 the controller 638 may select a portion of the identified remaining fuel cell stack segments. In an embodiment, the selected portion may be all identified remaining fuel cell stack segments. In another embodiment, the selected portion may be less than all identified remaining fuel cell stack segments, such as only a single identified remaining fuel cell stack segment.

In block 810 the controller 638 may determine an offset waveform for each selected remaining fuel cell stack segment such that a sum of each resulting ripple to be caused by the respective determined offset waveforms for each selected remaining fuel cell stack segment cancels the determined resulting ripple to be caused by the selected test waveform. In an embodiment, each offset waveform may be generated such that the resulting ripple is the same, such as one, two, three or more equal ripples that together cancel the ripple from the test waveform. In another embodiment, each offset waveform may be generated such that the resulting ripples are different, such as two, three, or more different ripples that together cancel the ripple from the test waveform.

In block 812 the controller 638 may control the DC converter of the fuel cell stack segment selected for impedance testing to inject the test waveform into the fuel cell stack. For example, the controller 638 may send control signals to a controller (e.g., 630, 632, 634, or 636) of the DC converter to cause the converter to perform pulse width modulation to generate the test waveform on an input connection to the fuel cell stack segment. In block 814 the controller 638 may control the DC converters of each selected remaining fuel cell stack segment to inject the offset waveform for each selected remaining fuel cell stack segment into each respective fuel cell stack segment. For example, the controller 638 may send control signals to the controllers (e.g., 630, 632, 634, and/or 636) of the DC converters to cause the converters to perform pulse width modulation to generate the offset waveforms on an input connection to their respective fuel cell stack segments. The operations of method 800 performed in blocks 812 and 814 may occur simultaneously, such that the test waveform and offset waveforms are injected at the same time resulting in ripples being output from the various DC converters that cancel each other out resulting in a the desired DC voltage on the DC bus. In block 816 the controller 638 may control the DC converter of the fuel cell stack segment selected for impedance testing to monitor the impedance response of the fuel cell stack in response to the injected test waveform. For example, the controller 638 may monitor the voltage and current response of the segment and determine the impedance according to method 1000 described further below with reference to FIG. 10.

In block 818 the controller 638 may determine a characteristic of the fuel cell stack segment selected for impedance testing based at least in part on the impedance response. As discussed above, the controller may use EIS monitoring to plot the real and imaginary parts of the measured impedances resulting from the injected test waveform and compare the plotted impedances to the known signatures of impedance responses of fuel cell stack segments with known characteristics. The known signatures of impedance responses of the fuel cell stack segments with known characteristics may be stored in a memory available to the controller. The stored known signatures of impedance responses of the fuel cell stack segments with known characteristics may be plots of the real and imaginary parts of the measured impedances of healthy fuel cell stack segments and damaged/degraded fuel cell stack segments derived from testing healthy (i.e., undamaged undegraded) and damaged/degraded fuel cell stack segments with various forms of damage (e.g., anode cracking) and/or degradation (e.g., segments operating in fuel starvation mode). The known characteristics may be correlated with the plots of the real and imaginary parts of the measured impedances stored in the memory. By matching the measured impedances to the known signatures of impedance responses, the current characteristics or state of the fuel cell stack may be determined as those characteristics correlated with the matching known signature of impedance response. In optional block 820 the controller 638 may indicate a failure mode based on the determined characteristic exceeding a failure threshold. For example, if the determined characteristic exceeds a failure threshold a failure mode of a fuel starvation state, catalyst damage and/or poisoning state, or a water flooding state may be indicated. In optional block 822 the controller 638 may adjust a setting of the fuel cell system based on the determined characteristic. For example, the controller 638 may adjust (e.g., increase or decrease) a fuel flow, air flow, drawn current from fuel cell segments, and/or water flow into the fuel inlet stream or shut off of the fuel cell system based on the determined characteristic. In this manner, impedance testing, such as EIS monitoring, may be used in a fuel cell system to adjust the operation of the fuel cell system based on current characteristics of the fuel cell stack segments.

Figure 9:
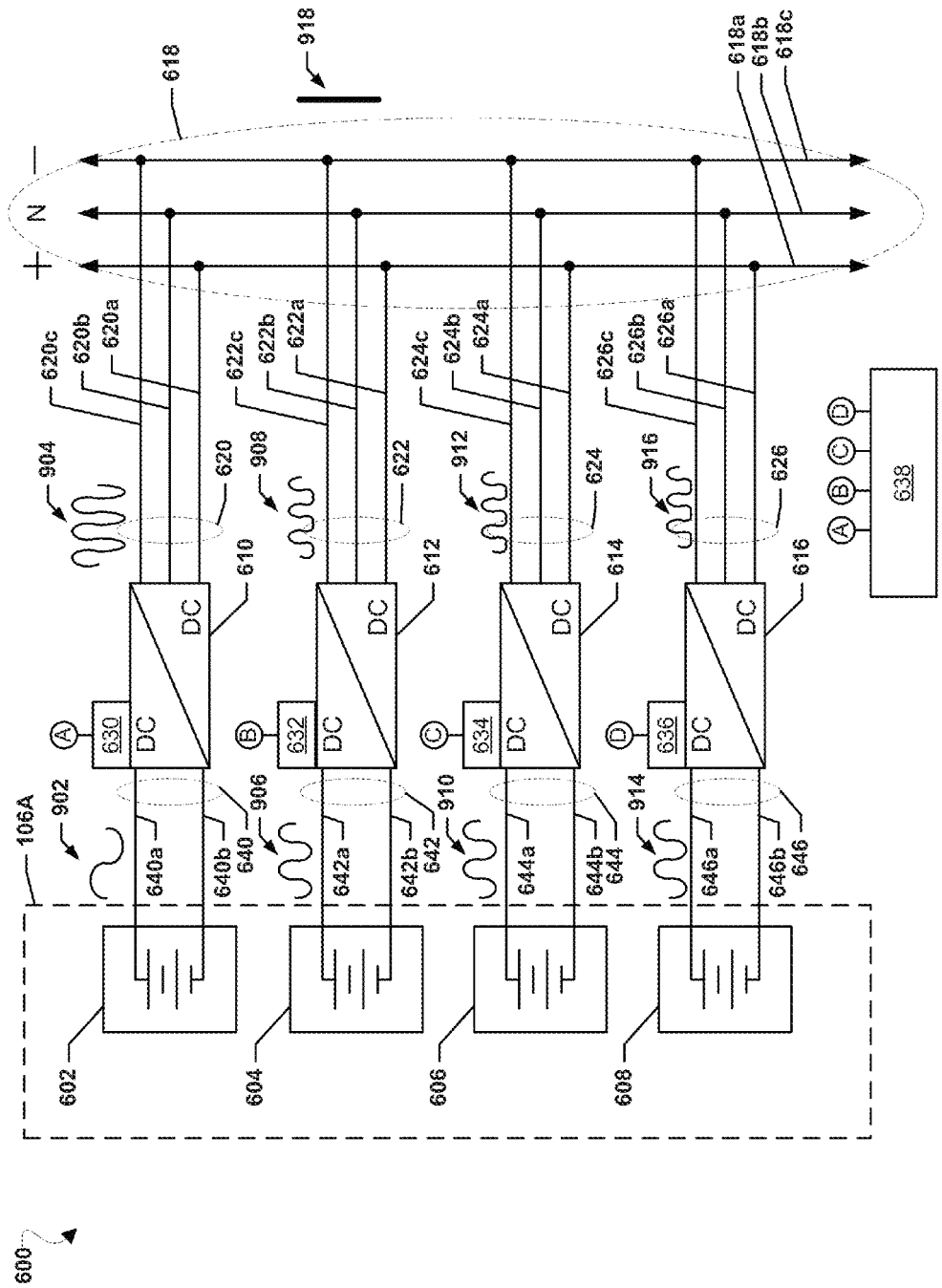
FIG. 9 is a block diagram of a system illustrating injected waveforms and resulting canceling ripples according to an embodiment.

FIG. 9 is a block diagram of the system 600 described above with reference to FIG. 6, illustrating injected waveforms 902, 906, 910, and 914 and resulting canceling ripples 904, 908, 912, and 916 according to an embodiment. A test waveform 902 may be injected into the input connection 640 resulting in a ripple 904 on the output connection 620 to the DC bus 618. An offset waveform 906 may be injected into the input connection 642 resulting in an offset ripple 908 on the output connection 622 to the DC bus 618. An offset waveform 910 may be injected into the input connection 644 resulting in an offset ripple 912 on the output connection 624 to the DC bus 618. An offset waveform 914 may be injected into the input connection 646 resulting in an offset ripple 916 on the output connection 626 to the DC bus 618. The sum of the ripples 904, 908, 912, and 916 may be such that steady DC voltage 918 without a ripple occurs on the DC bus 618 despite AC ripples occurring on the output connections 620, 622, 624, and 626. While the sum of the ripples 904, 908, 912, and 916 may be such that steady DC voltage 918 without a ripple results on the DC bus 618, the sum of the offset waveforms 906, 910, and 914 and the test waveform 902 need not equal zero. The offset ripples 908, 912, and 916 may all be the same or may be different. For example, offset ripple 908 may be a larger ripple than offset ripples 912 and 916. Additionally, whether or not the offset ripples 908, 912, and 916 are the same or different, the offset waveforms 906, 910, and 914 may not be the same. While three offset waveforms 906, 910, and 914 and their resulting offset ripples 908, 912, and 916 are illustrated, less offset waveforms and offset ripples, such as only two offset waveforms and resulting offset ripples or only one offset waveform and one resulting offset ripple, may be generated to offset the ripple 904.

In an alternative embodiment, the offset ripples 908, 912, and/or 916 may be generated by other devices, such as waveform generators, connected to output connections 622, 624, and 626 and controlled by the controller 638, rather than the power electronics 612, 614, and/or 616. The offset ripples 908, 912, and/or 916 may be generated by the other devices such that the sum of the ripples 904, 908, 912, and 916 may be the steady DC voltage 918 without a ripple on the DC bus 618. Additionally, combinations of ripples generated by the power electronics 612, 614, and/or 616 and the other devices, such as additional waveform generators, may be used to cancel the ripple 904 resulting in the steady DC voltage 918 without a ripple on the DC bus 618.

Figure 10:
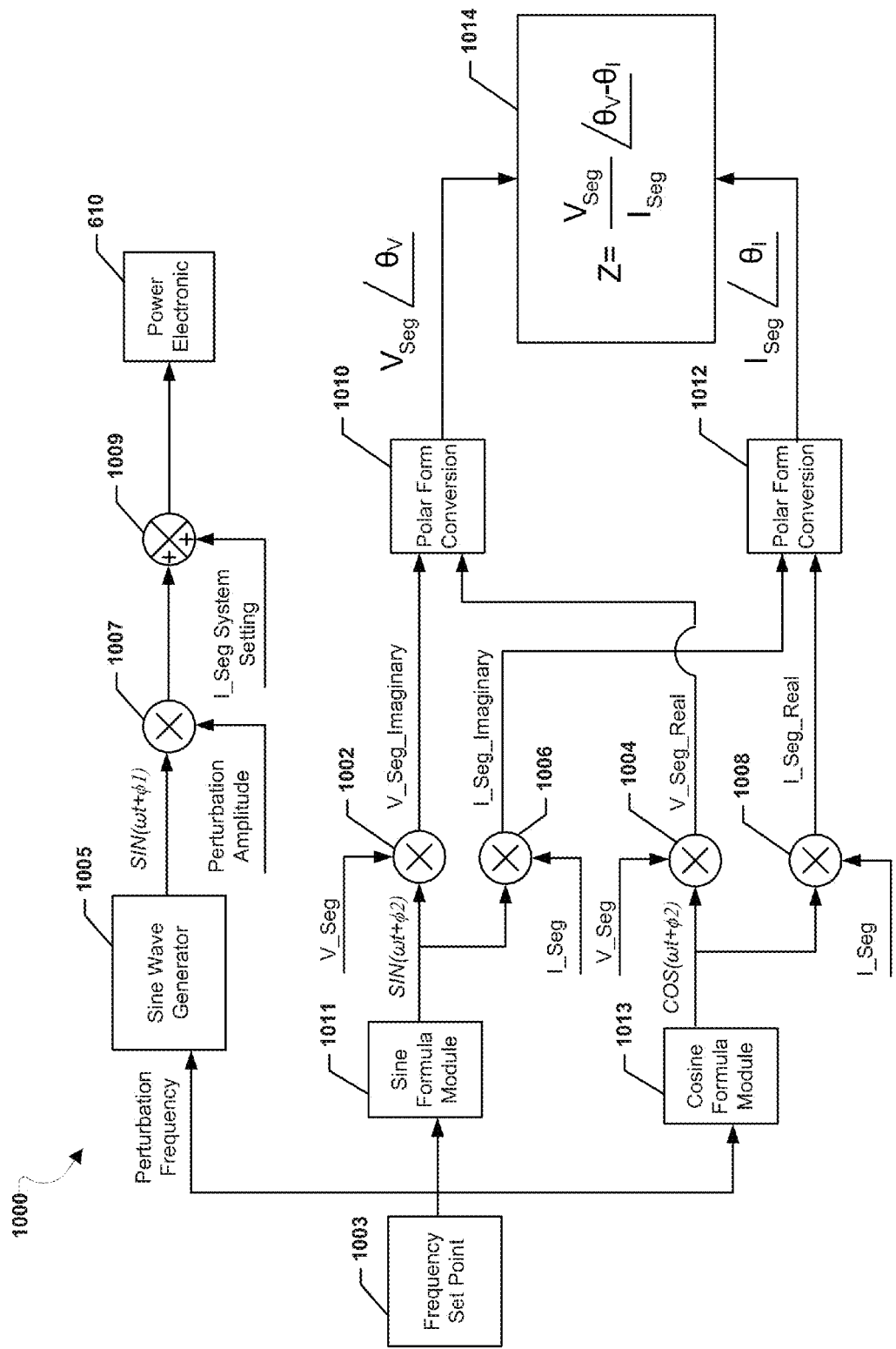
FIG. 10 is a process flow diagram illustrating an embodiment method for determining an impedance response for a fuel cell segment.

FIG. 10 is a process flow diagram illustrating an embodiment method 1000 for determining an impedance response for a fuel cell segment. In an embodiment, the operations of method 1000 may be performed by a controller, such as controller 638. The operations of method 1000 are discussed in terms of fuel cell stack segments and DC converters, but fuel cell stack segments and converters are used merely as examples. Other electrochemical devices and/or other power electronics may be used in the various operations of method 1000. In an embodiment, the operations of method 1000 may be performed in conjunction with the operations of method 800 described above with reference to FIG. 8.

In block 1003 the controller 638 may select a frequency set point (f) which may be output to a sine wave generator 1005 as the perturbation frequency. The sine wave generator 1005 may output a waveform $SIN(\omega t+\phi 1)$ where $\omega$ is the fundamental frequency ($2\pi f$) and $\phi 1$ is the phase angle. In operation 1007 the controller 638 may multiple the output waveform by the perturbation amplitude and in operation 1009 the controller may add the current for the segment set as a system setting (I_Seg System Setting) to generate a test waveform which may be sent to the power electronic 610 to cause the power electronic 610 to inject the waveform into the segment. The current for the segment set as a system setting may be a current setting provided from the controller 638 or another controller as a target current setting for the segment. While power electronic 610 is illustrated in FIG. 10, power electronic 610 may be substituted with any one of power electronics 612, 614, or 616 and similar operations may be performed to control power electronics 612, 614, and 616 to inject test waveforms.

The frequency set point may also be output to a sine formula module 1011 and a cosine formula module 1013. The sine formula module 1011 may output a waveform $SIN(\omega t+\phi 2)$ where $\omega$ is the fundamental frequency ($2\pi f$) and $\phi 2$ is the phase angle and the cosine formula module 1013 may output a waveform $COS(\omega t+\phi 2)$ where $\omega$ is the fundamental frequency ($2\pi f$) and $\phi 2$ is the phase angle. In operation 1002 the controller 638 may multiply the output waveform from the sine formula module 1011 with the voltage of the segment (V_Seg) to determine the imaginary voltage component of the segment (V_Seg_Imaginary). In operation 1006 the controller 638 may multiply the output waveform from the sine formula module 1011 with the current of the segment (I_Seg) to determine the imaginary current component of the segment (I_Seg_Imaginary). In operation 1004 the controller 638 may multiply the output waveform from the cosine formula module 1013 with the voltage of the segment (V_Seg) to determine the real voltage component of the segment (V_Seg_Real). In operation 1008 the controller 638 may multiple the output waveform from the cosine formula module 1013 with the current of the segment (I_Seg) to determine the real current component of the segment (I_Seg_Real). In blocks 1010 and 1012, respectively, the controller may convert the real and imaginary components of the voltage of the segment and the real and imaginary components of the current of the segment to polar form voltage of the segment and polar form current of the segment. In block 1014 the controller may determine the impedance "Z" of the segment as the polar form voltage of the segment over the polar form current of the segment. In this manner, the operations of method 1000 may enable a Fourier series calculation to be used to allow for analysis of an imperfect sinusoidal ripple at the fundamental frequency without needing to calculate a full Fast Fourier Transform. This may increase the accuracy of the impedance calculation and decrease the processing time required to determine an impedance response in comparison to impedance determinations made using a full Fast Fourier Transform.

Figure 11:
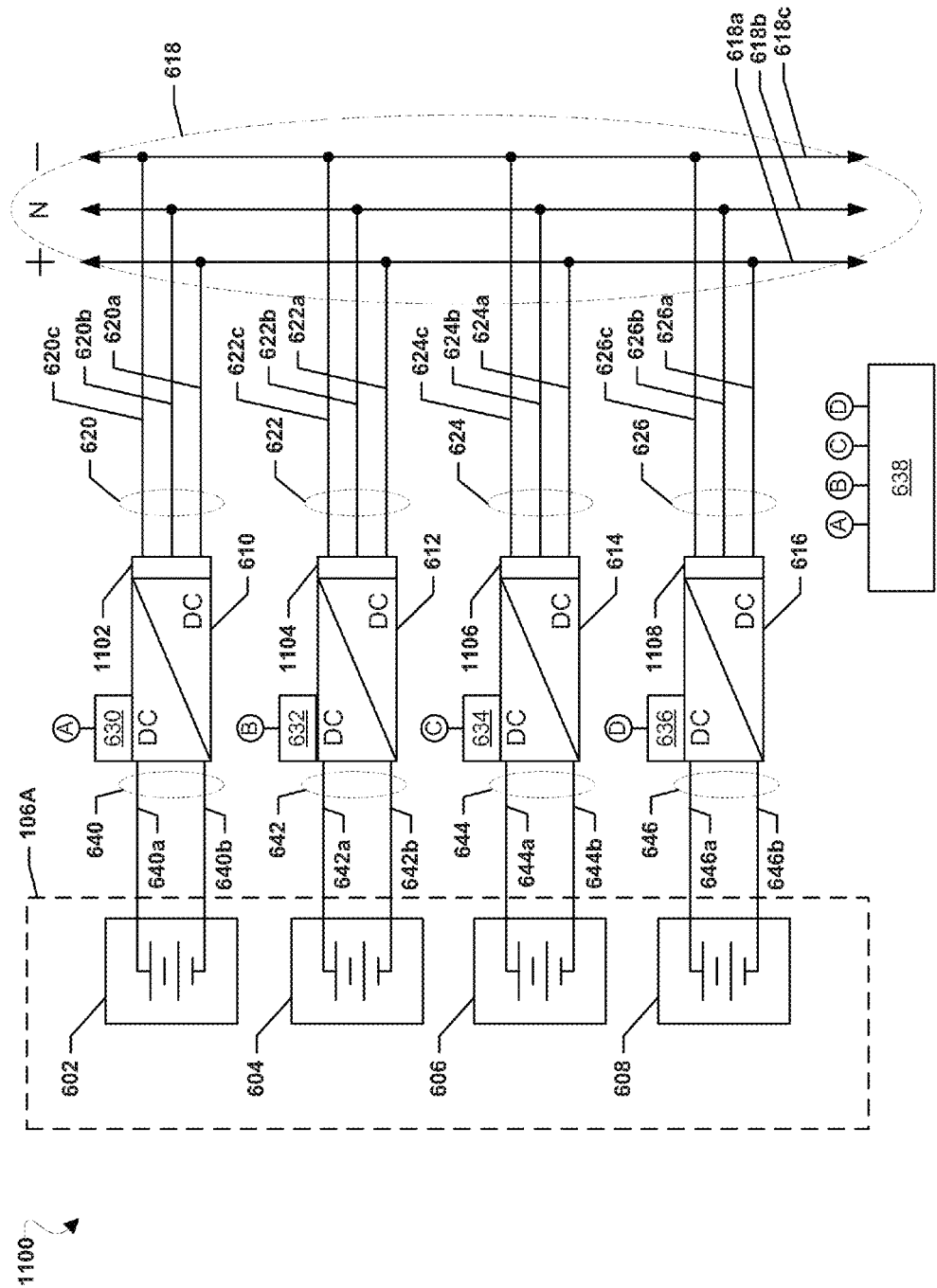
FIG. 11 is a block diagram of a system according to another embodiment.

FIG. 11 is a block diagram of a system 1100 according to another embodiment. The system 1100 is similar to system 600 illustrated in FIG. 6 and includes a number of components in common. Those components which are common to both systems 600 and 1100 are numbered with the same numbers in FIGS. 6 and 11 and will not be described further.

The system 1100 is similar to the system 600 described above with reference to FIG. 6, except that energy storage devices 1102, 1104, 1106, and 1108 may be included on the power electronics 610, 612, 614, and 616, respectively. Energy storage devices 1102, 1104, 1106, and 1108 may be any type energy storage devices, such as capacitors, supercapacitors, batteries, etc. In an embodiment, the energy storage devices 1102, 1104, 1106, and 1108 may be on the output of their respective power electronics 610, 612, 614, and 616 to store ripple energy and discharge the ripple energy out of phase. The discharge out of phase by an energy storage device 1102, 1104, 1106, or 1108 may provide cancelation of the ripple current output on the respective output connection 620, 622, 624, or 626 to the DC bus 618 as a result of a test waveform injected into the input connection of the power electronic 610, 612, 614, or 616 associated with that energy storage device 1102, 1104, 1106, or 1108. In this manner, the energy storage device 1102, 1104, 1106, or 1108 may reduce the ripple current, or eliminate the ripple current, passing to the DC bus 618. The ability to reduce and/or eliminate the ripple current resulting from EIS testing may enable EIS testing using test waveforms with higher frequencies than may be used without the energy storage devices 1102, 1104, 1106, or 1108. For example, test waveforms with frequencies at or above 400 Hz may be used, greatly extending the bandwidth of the respective power electronics 610, 612, 614, and 616 to create and analyze test waveforms. Without the energy storage devices 1102, 1104, 1106, or 1108, the bandwidth of the test waveform frequencies may be practically limited to frequencies less than the switching frequency of the power electronics 610, 612, 614, and 616. With the energy storage devices 1102, 1104, 1106, or 1108, the bandwidth of the test waveform frequencies may extend to frequencies greater than the switching frequency of the power electronics 610, 612, 614, and 616.

While illustrated as on the output of their respective power electronics 610, 612, 614, and 616 in FIG. 11, the energy storage devices 1102, 1104, 1106, and 1108 may be on any other portions of their respective power electronics 610, 612, 614, and 616 to store ripple energy and discharge the ripple energy out of phase. In an alternative embodiment, the energy storage devices 1102, 1104, 1106, and 1108 may be on the input of their respective power electronics 610, 612, 614, and 616 to store ripple energy and discharge the ripple energy out of phase. In another alternative embodiment, an additional winding may be added to the transformers of the energy storage devices 1102, 1104, 1106, and 1108 and the energy storage devices 1102, 1104, 1106, and 1108 may be connected to the this additional winding to store ripple energy and discharge the ripple energy out of phase.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A system, comprising:
   a direct current ("DC") bus;
   a first electrochemical device electrically connected via a first input connection to a first DC converter, wherein the first DC converter is connected via a first output connection to the DC bus;
   at least one second electrochemical device electrically connected via at least one second input connection to at least one second DC converter, wherein the at least one second DC converter is connected via the at least one second output connection to the DC bus and wherein the first output connection and the at least one second output connection connect the first DC converter and the at least one second DC converter to the DC bus in parallel; and
   a processor connected to the first DC converter and the at least one second DC converter, wherein the processor is configured with processor-executable instructions to perform operations comprising:
      selecting a test waveform to inject onto the first input connection from the first DC converter to the first electrochemical device;
      determining a first resulting ripple on the first output connection that will be generated in response to injecting the test waveform onto the first input connection;
      determining at least one offset waveform to inject onto the at least one second input connection from the at least one second DC converter to the at least one second electrochemical device such that one or more second ripples which will be provided to the at least one second output connection cancel the first resulting ripple;
      controlling the first DC converter to inject the test waveform onto the first input connection; and
      controlling the at least one second DC converter to inject the at least one offset waveform onto the at least one second input connection.

2. The system of claim 1, wherein the first electrochemical device is a first fuel cell stack segment and the at least one second electrochemical device is at least one second fuel cell stack segment.

3. The system of claim 2, wherein the processor is configured with processor-executable instructions to perform operations further comprising:
   controlling the first DC converter to monitor an impedance response of the first fuel cell segment using impedance spectroscopy ("EIS") in response to the injected test waveform; and determining a characteristic of the first fuel cell segment based at least in part on the impedance response of the first fuel cell segment.

4. The system of claim 3, wherein the processor is configured with processor-executable instructions to perform operations further comprising adjusting a setting of the first fuel cell segment based on the determined characteristic.

5. The system of claim 4, wherein the determined characteristic is a fuel utilization rate and wherein the processor is configured with processor-executable instructions to perform operations such that adjusting a setting of the first fuel cell segment based on the determined characteristic comprises adjusting a fuel flow setting of the first fuel cell segment based on the determined fuel utilization rate.

6. The system of claim 3, wherein the processor is configured with processor-executable instructions to perform operations further comprising:
determining whether the determined characteristic exceeds a failure threshold; and
indicating a failure mode in response to determining the determined characteristic exceeds the failure threshold.

7. The system of claim 6, wherein the failure mode is a fuel starvation state, an anode catalyst poisoning state, an anode catalyst damage state, or a water flooding state.

8. The system of claim 3, wherein at least one second electrochemical device electrically connected via at least one second input connection to at least one second DC converter, wherein the at least one second DC converter is connected via at least second output connection to the DC bus and wherein the first output connection and the at least one second output connection connect the first DC converter and the at least one second DC converter to the DC bus in parallel comprises:
a second fuel cell stack segment electrically connected via a second input connection to a second DC converter, wherein the second DC converter is connected via a second output connection to the DC bus;
a third fuel cell stack segment electrically connected via a third input connection to a third DC converter, wherein the third DC converter is connected via a third output connection to the DC bus; and
a fourth fuel cell stack segment electrically connected via a fourth input connection to a fourth DC converter, wherein the fourth DC converter is connected via a fourth output connection to the DC bus and wherein the first output connection, second output connection, third output connection, and fourth output connection connect the first DC converter, second DC converter, third DC converter, and fourth DC converter to the DC bus in parallel, and
wherein the processor is configured with processor-executable instructions to perform operations such that:
determining at least one offset waveform to inject onto the at least one second input connection from the at least one second DC converter to the at least one second electrochemical device such that one or more second ripples which will be provided to the at least one second output connection cancel the first resulting ripple comprises determining a second offset waveform to inject onto the second input connection from the second DC converter to the second fuel cell stack segment, a third offset waveform to inject onto the third input connection from the third DC converter to the third fuel cell stack segment, and a fourth offset waveform to inject onto the fourth input connection from the fourth DC converter to the fourth fuel cell stack segment such that a sum of a second ripple on the second output connection, a third ripple on the third output connection, and a fourth ripple on the fourth output connection cancels the first resulting ripple; and
controlling the at least one second DC converter to inject the at least one offset waveform onto the at least one second input connection comprises:
controlling the second DC converter to inject the second offset waveform onto the second input connection;
controlling the third DC converter to inject the third offset waveform onto the third input connection; and
controlling the fourth DC converter to inject the fourth offset waveform onto the fourth input connection.

9. The system of claim 8, wherein the first fuel cell stack segment, the second fuel cell stack segment, the third fuel cell stack segment, and the fourth fuel cell stack segment are all segments of a solid oxide fuel cell system, proton exchange membrane fuel cell system, phosphoric acid fuel cell system, or molten carbonate fuel cell system.

10. The system of claim 3, wherein controlling the first DC converter to monitor an impedance response of the first fuel cell segment using EIS in response to the injected test waveform comprises:
converting real and imaginary components of a voltage of the first fuel cell segment and real and imaginary components of a current of the first fuel cell segment to a polar form voltage of the first fuel cell segment and a polar form current of the first fuel cell segment; and
determining an impedance of the first fuel cell segment as the polar form voltage of the first fuel cell segment over the polar form current of the first fuel cell segment.

11. The system of claim 1, wherein the first DC converter includes an energy storage device configured to store ripple energy and discharge the ripple energy out of phase.

12. The system of claim 11, wherein the energy storage device is on the first input connection, the first output connection, or a winding on a transformer of the first DC converter.

13. The system of claim 1, wherein the first electrochemical device and the second electrochemical device are both battery cells, electrolysis cells, or electrochemical pumping cells.

14. A method, comprising:
selecting a test waveform to inject onto a first input connection from a first DC converter to a first electrochemical device;
determining a first resulting ripple on a first output connection of the first DC converter that will be generated in response to injecting the test waveform onto the first input connection;
determining at least one offset waveform to inject onto at least one second input connection from at least one second DC converter to at least one second electrochemical device such that one or more second ripples which will be provided to at least one second output connection of the at least one second DC converter cancel the first resulting ripple;
injecting the test waveform onto the first input connection; and
injecting the at least one offset waveform onto the at least one second input connection, wherein the first output connection and at least one second output connection connect the first DC converter and the at least one second DC converter to a DC bus in parallel.

15. The method of claim 14, wherein the first electrochemical device is a first fuel cell stack segment and the at least one second electrochemical device is at least one second fuel cell stack segment.

16. The method of claim 15, further comprising:
monitoring an impedance response of the first fuel cell segment using electrochemical impedance spectroscopy ("EIS") in response to the injected test waveform; and
determining a characteristic of the first fuel cell segment based at least in part on the impedance response of the first fuel cell segment.

17. The method of claim 16, further comprising adjusting a setting of the first fuel cell stack segment based on the determined characteristic.

18. The method of claim 17, wherein the determined characteristic is a fuel utilization rate and wherein adjusting a setting of the first fuel cell stack segment comprises adjusting a fuel flow setting of the first fuel cell stack segment based on the determined fuel utilization rate.

19. The method of claim 16, further comprising:
determining whether the determined characteristic exceeds a failure threshold; and
indicating a failure mode in response to determining the determined characteristic exceeds the failure threshold.

20. The method of claim 19, wherein the failure mode is a fuel starvation state, an anode catalyst poisoning state, an anode catalyst damage state, or a water flooding state.

21. The method of claim 16, wherein:
determining at least one offset waveform to inject onto at least one second input connection from at least one second DC converter to at least one second electrochemical device such that one or more second ripples which will be provided to at least one second output connection of the at least one second DC converter cancel the first resulting ripple comprises determining a second offset waveform to inject onto a second input connection from a second DC converter to a second fuel cell stack segment, a third offset waveform to inject onto a third input connection from a third DC converter to a third fuel cell stack segment, and a fourth offset waveform to inject onto a fourth input connection from a fourth DC converter to a fourth fuel cell stack segment such that a sum of a second ripple on a second output connection of the second DC converter, a third ripple on a third output connection of the third DC converter, and a fourth ripple on a fourth output connection of the fourth DC converter cancels the first resulting ripple;
injecting the offset waveform onto the at least one second input connection comprises:
injecting the second offset waveform onto the second input connection;
injecting the third offset waveform onto the third input connection; and
injecting the fourth offset waveform onto the fourth input connection; and
the first output connection, second output connection, third output connection, and fourth output connection connect the first DC converter, the second DC converter, third DC converter, and fourth DC converter to the DC bus in parallel.

22. The method of claim 21, wherein the first fuel cell stack segment, the second fuel cell stack segment, the third fuel cell stack segment, and the fourth fuel cell stack segment are all segments of a solid oxide fuel cell system, proton exchange membrane fuel cell system, phosphoric acid fuel cell system, or molten carbonate fuel cell system.

23. The method of claim 16, wherein monitoring an impedance response of the first fuel cell segment using EIS in response to the injected test waveform comprises:
converting real and imaginary components of a voltage of the first fuel cell segment and real and imaginary components of a current of the first fuel cell segment to a polar form voltage of the first fuel cell segment and a polar form current of the first fuel cell segment; and
determining an impedance of the first fuel cell segment as the polar form voltage of the first fuel cell segment over the polar form current of the first fuel cell segment.

24. The method of claim 14, wherein the first DC converter includes an energy storage device, the method further comprising:
storing ripple energy and discharging the ripple energy out of phase.

25. The method of claim 24, wherein the energy storage device is on the first input connection, the first output connection, or a winding on a transformer of the first DC converter.

26. The method of claim 14, wherein the first electrochemical device and the second electrochemical device are both battery cells, electrolysis cells, or electrochemical pumping cells.

27. A system, comprising:
a direct current ("DC") bus;
a first fuel cell segment electrically connected via a first input connection to a first DC converter, wherein the first DC converter is connected via a first output connection to the DC bus;
at least one second device connected via at least one second output connection to the DC bus; and
a processor connected to the first DC converter and the at least one second device, wherein the processor is configured with processor-executable instructions to perform operations comprising:
injecting an electrochemical impedance spectroscopy test waveform into the first fuel cell segment to generate a first resulting ripple to the DC bus; and
injecting at least one second offset ripple to the DC bus from the at least one second device, wherein the at least one second offset ripple at least partially offsets the first resulting ripple on the DC bus.

28. The system of claim 27, wherein the at least one second device is at least one waveform generator.

29. The system of claim 27, wherein:
the at least one second device is at least one second DC converter electrically connected via at least one second input connection to at least one second fuel cell segment;
the first output connection and the at least one second output connection are connected to the DC bus in parallel; and
the processor is configured with processor-executable instructions to perform operations such that injecting at least one second offset ripple to the DC bus from the at least one second device comprises injecting at least one offset waveform into the at least one second fuel cell segment to generate at least one second offset ripple to the output bus.

30. A method of operating a fuel cell system, comprising:
injecting an electrochemical impedance spectroscopy test waveform into a first fuel cell segment to generate a first resulting ripple to an output bus of the fuel cell system; and
injecting at least one second offset ripple to the output bus,
wherein the at least one second offset ripple at least partially offsets the first resulting ripple on the output bus.

31. The method of claim 30, wherein injecting at least one second offset ripple to the output bus is performed by a waveform generator connected to an input line to the output bus.

32. The method of claim 30, wherein:
injecting at least one second offset ripple to the output bus comprises injecting at least one offset waveform into at least one second fuel cell segment to generate at least one second offset ripple to the output bus; and
the at least one second fuel cell segment is connected to the output bus in parallel with the first fuel cell segment.

\* \* \* \* \*